US011941054B2

(12) United States Patent
Shu et al.

(10) Patent No.: US 11,941,054 B2
(45) Date of Patent: Mar. 26, 2024

(54) ITERATIVE CONSTRAINT SOLVING IN ABSTRACT GRAPH MATCHING FOR CYBER INCIDENT REASONING

(71) Applicant: International Business Machines Corporation, Armonk, NY (US)

(72) Inventors: Xiaokui Shu, Ossining, NY (US); Douglas L. Schales, Ardsley, NY (US); Marc Philippe Stoecklin, White Plains, NY (US); Frederico Araujo, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 400 days.

(21) Appl. No.: 16/158,863

(22) Filed: Oct. 12, 2018

(65) Prior Publication Data
US 2020/0120109 A1  Apr. 16, 2020

(51) Int. Cl.
*G06F 18/22* (2023.01)
*G06F 16/901* (2019.01)
(Continued)

(52) U.S. Cl.
CPC .......... *G06F 16/9024* (2019.01); *G06F 18/22* (2023.01); *H04L 63/1416* (2013.01);
(Continued)

(58) Field of Classification Search
CPC ............. H04L 63/1416; H04L 63/1425; H04L 29/06884; H04L 29/06911; G06F 16/9024;
(Continued)

(56) References Cited

U.S. PATENT DOCUMENTS 7,530,105 B2 * 5/2009 Gilbert .................... G06F 21/55
709/222
7,624,448 B2 * 11/2009 Coffman ............. H04L 63/1416
726/22
(Continued)

OTHER PUBLICATIONS

"Davenport et al., Genet: A Connectionist Architecture for Solving Constraint Satisfaction Problems by Iterative Improvement, 1994, AAAI, pp. 1-6" (Year: 1994).*
(Continued)

*Primary Examiner* — Oleg Korsak
*Assistant Examiner* — Nhan Huu Nguyen
(74) *Attorney, Agent, or Firm* — Aaron Pontikos

(57) ABSTRACT

A technique for storage-efficient cyber incident reasoning by graph matching. The method begins with a graph pattern that comprises a set of elements with constraints and connections among them. A graph of constraint relations (GoC) in the graph pattern is derived. An activity graph representing activity data captured in association with a host machine is then obtained. In response to a query, one or more subgraphs of the activity graph that satisfy the graph pattern are then located and, in particular, by iteratively solving constraints in the graph pattern. In particular, a single element constraint is solved to generate a result, and that result is propagated to connected constraints in the graph of constraint relations. This process continues until all single element constraints have been evaluated, and all propagations have been performed. The subgraphs of the activity graph that result are then returned in response to a database query.

21 Claims, 21 Drawing Sheets

(51) Int. Cl.
*H04L 9/40* (2022.01)
*G06N 5/04* (2023.01)
*G06N 20/00* (2019.01)

(52) U.S. Cl.
CPC .......... *H04L 63/1425* (2013.01); *G06N 5/04* (2013.01); *G06N 20/00* (2019.01)

(58) Field of Classification Search
CPC ...... G06F 21/50; G06K 9/6201; G06N 20/00; G06N 5/04
See application file for complete search history.

(56) References Cited

U.S. PATENT DOCUMENTS

| | | | | |
|---|---|---|---|---|
| 7,925,599 | B2* | 4/2011 | Koren | G06F 18/22 706/12 |
| 7,933,915 | B2* | 4/2011 | Singh | G06F 16/9024 711/161 |
| 8,396,884 | B2* | 3/2013 | Singh | G06F 16/9024 707/E17.03 |
| 8,473,523 | B2* | 6/2013 | Goyal | G06F 16/90344 707/798 |
| 9,225,730 | B1* | 12/2015 | Brezinski | G06F 21/00 |
| 9,256,739 | B1* | 2/2016 | Roundy | H04L 41/0631 |
| 9,392,003 | B2 | 7/2016 | Amsler | |
| 9,785,673 | B2* | 10/2017 | Bornea | G06F 16/24545 |
| 9,917,739 | B2* | 3/2018 | Levchuk | H04L 41/14 |
| 10,116,679 | B1* | 10/2018 | Wu | H04W 12/121 |
| 10,162,970 | B2* | 12/2018 | Olson | H04L 63/1441 |
| 10,186,060 | B2* | 1/2019 | Maruhashi | G06F 21/00 |
| 10,237,294 | B1* | 3/2019 | Zadeh | H04L 43/08 |
| 10,432,660 | B2* | 10/2019 | Crabtree | H04L 63/1433 |
| 10,511,498 | B1* | 12/2019 | Narayan | H04L 43/026 |
| 10,803,122 | B2* | 10/2020 | Yanagisawa | G06F 18/22 |
| 10,810,210 | B2* | 10/2020 | Choudhury | G06F 16/2379 |
| 10,885,116 | B2* | 1/2021 | Haglin | G06F 18/29 |
| 10,885,117 | B2* | 1/2021 | Haglin | G06F 18/29 |
| 2005/0162429 | A1 | 7/2005 | Stamm et al. | |
| 2007/0010901 | A1 | 1/2007 | Fukui | |
| 2007/0209074 | A1* | 9/2007 | Coffman | H04L 63/145 726/23 |
| 2007/0226796 | A1* | 9/2007 | Gilbert | H04L 63/1425 726/22 |
| 2007/0239694 | A1* | 10/2007 | Singh | G06F 16/9024 |
| 2008/0082352 | A1 | 4/2008 | Schmidtler et al. | |
| 2008/0120400 | A1* | 5/2008 | Keller | G06Q 10/06 709/223 |
| 2008/0178293 | A1* | 7/2008 | Keen | H04L 63/1416 726/23 |
| 2009/0204554 | A1* | 8/2009 | Koren | G06F 16/9024 706/12 |
| 2010/0070449 | A1* | 3/2010 | Arnold | G06N 5/02 706/48 |
| 2010/0114973 | A1* | 5/2010 | Goyal | G06F 16/90344 707/E17.084 |
| 2010/0235879 | A1* | 9/2010 | Burnside | H04L 63/1425 726/1 |
| 2011/0173189 | A1* | 7/2011 | Singh | G06F 16/9024 707/722 |
| 2013/0254895 | A1 | 9/2013 | Neil et al. | |
| 2015/0020199 | A1* | 1/2015 | Neil | H04L 1/002 726/23 |
| 2015/0026103 | A1* | 1/2015 | Goldschmidt | G06N 20/00 706/12 |
| 2015/0049634 | A1* | 2/2015 | Levchuk | G06Q 50/01 370/254 |
| 2015/0106324 | A1* | 4/2015 | Puri | G06F 11/079 706/52 |
| 2015/0149440 | A1* | 5/2015 | Bornea | G06F 16/24545 707/719 |
| 2015/0365427 | A1 | 12/2015 | Ben-Shalom et al. | |
| 2016/0026939 | A1* | 1/2016 | Schiffer | G06K 9/00288 705/7.11 |
| 2016/0078365 | A1* | 3/2016 | Baumard | G06N 20/00 706/12 |
| 2016/0125094 | A1* | 5/2016 | Li | G06F 16/9024 707/741 |
| 2016/0148103 | A1* | 5/2016 | Sarrafzadeh | G06K 9/469 706/46 |
| 2016/0191560 | A1* | 6/2016 | Pegna | H04L 63/1425 726/23 |
| 2016/0219066 | A1* | 7/2016 | Vasseur | H04L 63/1425 |
| 2016/0301704 | A1* | 10/2016 | Hassanzadeh | H04L 63/1433 |
| 2016/0306850 | A1* | 10/2016 | Bornea | G06F 16/2453 |
| 2016/0371489 | A1* | 12/2016 | Puri | H04L 63/1425 |
| 2017/0054738 | A1 | 2/2017 | Avidan et al. | |
| 2017/0134411 | A1 | 5/2017 | Ye | |
| 2017/0154445 | A1* | 6/2017 | Maruhashi | G06F 21/00 |
| 2017/0228448 | A1* | 8/2017 | Fan | G06Q 10/101 |
| 2017/0230410 | A1 | 8/2017 | Hassanzaden et al. | |
| 2017/0308620 | A1* | 10/2017 | Cao | G06F 16/24542 |
| 2018/0013771 | A1* | 1/2018 | Crabtree | H04L 63/1433 |
| 2018/0032724 | A1* | 2/2018 | Tang | H04L 63/1425 |
| 2018/0211047 | A1* | 7/2018 | Olson | G06F 21/577 |
| 2018/0219888 | A1* | 8/2018 | Apostolopoulos | H04L 63/1425 |
| 2018/0293328 | A1* | 10/2018 | Yanagisawa | G06F 18/213 |
| 2018/0329958 | A1* | 11/2018 | Choudhury | G06F 16/2343 |
| 2019/0325076 | A1* | 10/2019 | Haglin | G06F 18/2323 |
| 2019/0325077 | A1* | 10/2019 | Haglin | G06F 18/22 |

OTHER PUBLICATIONS

Gurucul, "User and Entity Behavior Analytics—Use Cases," 2018.
Santos et al, "Method of Automated Cyber Risk Assessment Insurance Underwriting and Remediation," IP.com, Aug. 23, 2017.
"Analytic Forecasting of Future Electronic Cyber Threats with Deep Learning and Coevoltionary Strategies," IP.com, Oct. 28, 2015.
"Comprehensive Incident Classification Standard," IP.com, Mar. 16, 2015.
Davenport et al., "GENET: a connectionist architecture for solving constraint satisfaction problems by iterative improvement", 1994, Proceedings 12th National Conference for Artificial Intelligence (AAAI), pp. 325-330.

* cited by examiner

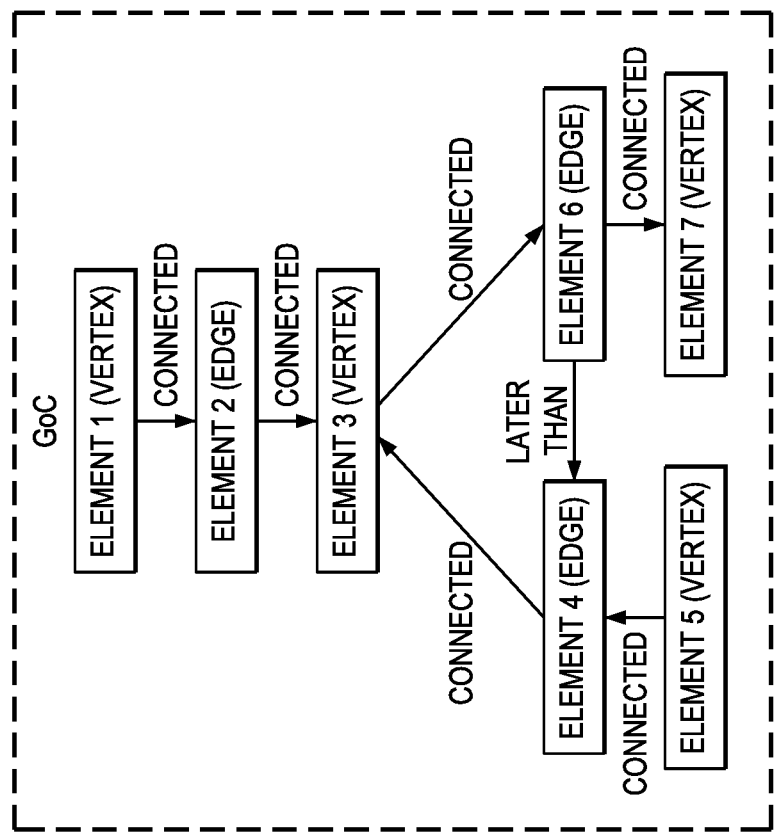
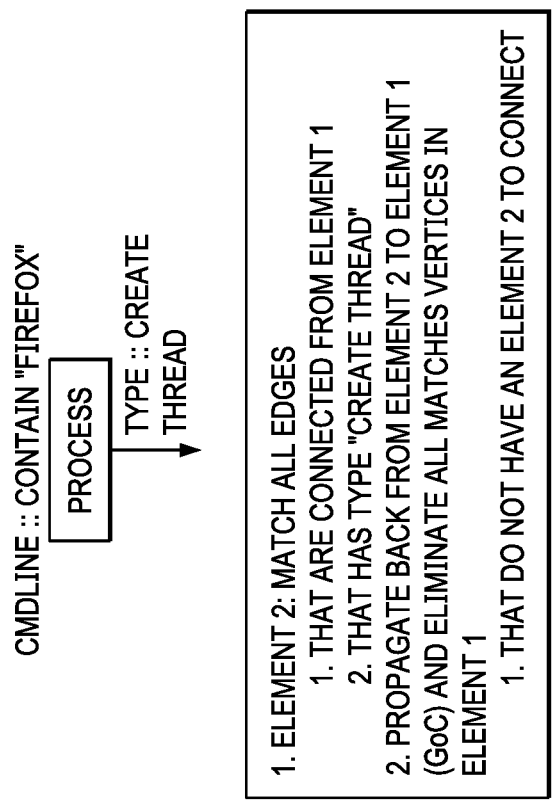
FIG. 21

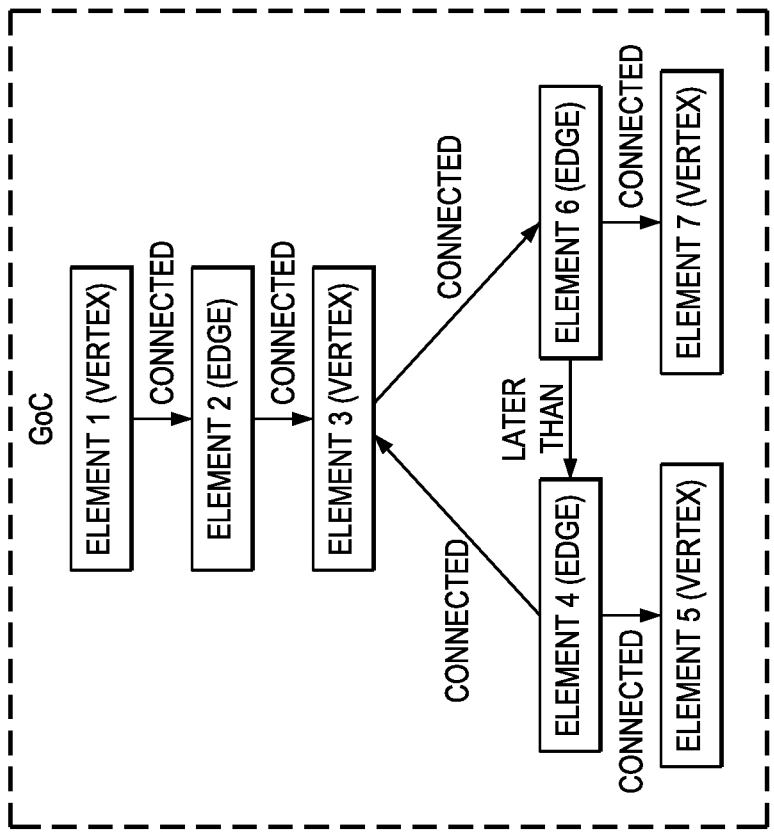
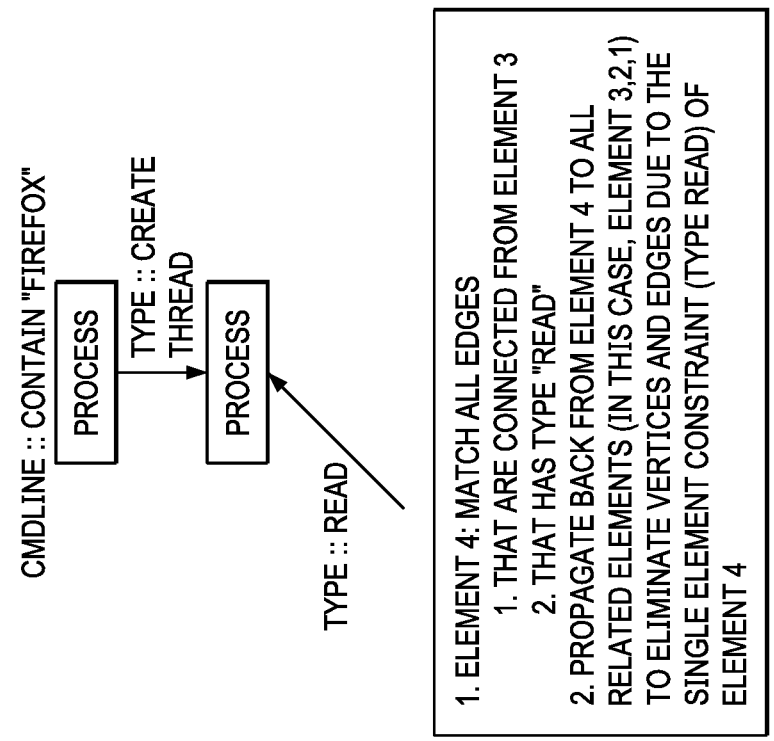
FIG. 23

ITERATIVE CONSTRAINT SOLVING IN ABSTRACT GRAPH MATCHING FOR CYBER INCIDENT REASONING

STATEMENT REGARDING SPONSORED RESEARCH

This invention was made with government support under Contract FA8650-15-C-7561 awarded by the Defense Advanced Research Projects Agency (DARPA). The government has certain rights in the invention.

BACKGROUND

Technical Field

This disclosure relates generally to cybersecurity.

Background of the Related Art

Emerging cyberattacks, such as advanced persistent threat (APT), have become more stealthy and sophisticated, usually involving inter-operation of multiple processes. To achieve their attack goals, such comprehensive attack campaigns usually consist of long attack paths/vectors that exploit multiple processes on a single host, or on multiple hosts. Thus, understanding inter-process behavior is important to identifying attacks and reducing false alarms.

Intrusion and anomaly detection products, systems and services are well-known. Indeed, methods for intrusion detection and anti-virus solutions were introduced decades ago. Most traditional host-based and network-based attack/intrusion detection products utilize a static signature matching approach. For example, traditional anti-virus, firewall, intrusion detection systems (IDS), and the like, rely on concrete binary or network communication signatures to identify attacks. The detection procedure typically includes: (i) attack discovery, (ii) signature selection, (iii) signature distribution, and (iv) endpoint signature matching.

A new class of detection mechanisms tries to port more and more intelligence into an endpoint. These mechanisms, however, typically focus on single-process detection. Intra-process behavior modeling and detection also is well-known, as evidenced by program anomaly detection literature, as well as most state-of-the-art commercial endpoint intrusion detection products. These mechanisms basically monitor system events, e.g., system calls and/or Windows APIs of each process, and then decide whether the process is malicious based on its behavior model. A solution of this type can be nullified when stealthy attacks are implemented across processes, or when the attacker leverages benign processes to achieve attack goals.

Although the above-described approaches provide advantages, they often cannot detect new or rapidly updated attacks in a timely manner or provide sufficient attack surface coverage with respect to attacks that leverage inter-process activities. Some behavior-based endpoint detection products attempt to address these deficiencies by attempting to model direct inter-process activities, such as process spawning, and malware downloading. While inter-process activity modeling of this type is useful, the known solutions operate on an ad hoc basis, with only a small amount of direct inter-process activity being modeled due to practicality constraints in existing products. Moreover, these approaches do not address indirect inter-process activities. Thus, even where some inter-process activity modeling is available, an attacker can circumvent the detection, e.g., by constructing stealthy attacks with multiple processes and files in a large time window. One example of such an attack was the recent Target data breach, during which breached data from point-of-sale machines was encrypted onto disk but later read by another process at the working time for aggregation. In this circumstance, the indirect inter-process activities (between the processes that wrote and read the encrypted files) were not explicit, and thus were not identified and mitigated.

Existing work for cyber incident reasoning focuses either on the exact match of signatures, or on regular expression-based string matching. These known approaches do not deal with abstract graph patterns, which are a category of high-level behavior description of malicious/interesting behaviors.

Abstract graph pattern matching is an important operation in behavior-based threat detection and cyber hunting. Given an abstract pattern, e.g., a process creates a thread into another process, graph pattern matching algorithms search the monitored host for such activities. Matched activities are returned for further inspection, e.g., by security analysts or threat hunters. In addition, advanced abstract patterns such as "a specific file flows to any network sockets in n steps," are useful for detecting data exfiltration. More generally, an abstract graph pattern can be thought of as elements with constraints (or predicate expressions) and connections among them. Pattern matching requires satisfying all constraints of all elements, as well as how they are connected. This task is computationally non-trivial because a pattern can refer to other patterns via parameters, and because graphs are typically stored on distributed external storage, making it expensive to check data associated with each predicate.

BRIEF SUMMARY

This disclosure provides for storage-efficient cyber incident reasoning by graph matching. The technique begins by providing a graph pattern that comprises a set of elements with constraints and connections among them. A constraint is one of: a single element defining an attribute of a node or edge in the graph pattern, and an element relation defining how one element relates to another element in the graph pattern. According to the method, a graph of constraint relations (GoC) in the graph pattern is derived. An activity graph representing activity data captured in association with a host machine is then obtained. In response to a query (e.g., to a graph database), one or more subgraphs of the activity graph that satisfy the graph pattern are then located and, in particular, by iteratively solving constraints in the graph pattern. In this approach, and for information storage and retrieval efficiency, the constraints are solved serially and with an associated propagation function. In particular, a single element constraint is solved to generate a result, and that result is then propagated to connected constraints in the graph of constraint relations. The propagating operation evaluates whether a previously-satisfied constraint remains valid and, if not, an associated subgraph of the activity graph represented by the previously-satisfied constraint is discarded. The steps of single element constraint solving are repeated and single element constraints are evaluated followed by propagations. This process continues until all single element constraints have been evaluated, and all propagations have been performed. The subgraphs of the activity graph that result are then returned in response to a database query.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the present invention and the advantages thereof, reference is now made to the following descriptions taken in conjunction with the accompanying drawings, in which:

FIGS. 20-23 depict application of the iterative constraint solving algorithm of this disclosure with respect to the pattern graph of FIG. 19.

DETAILED DESCRIPTION OF AN ILLUSTRATIVE EMBODIMENT

Figure 1:
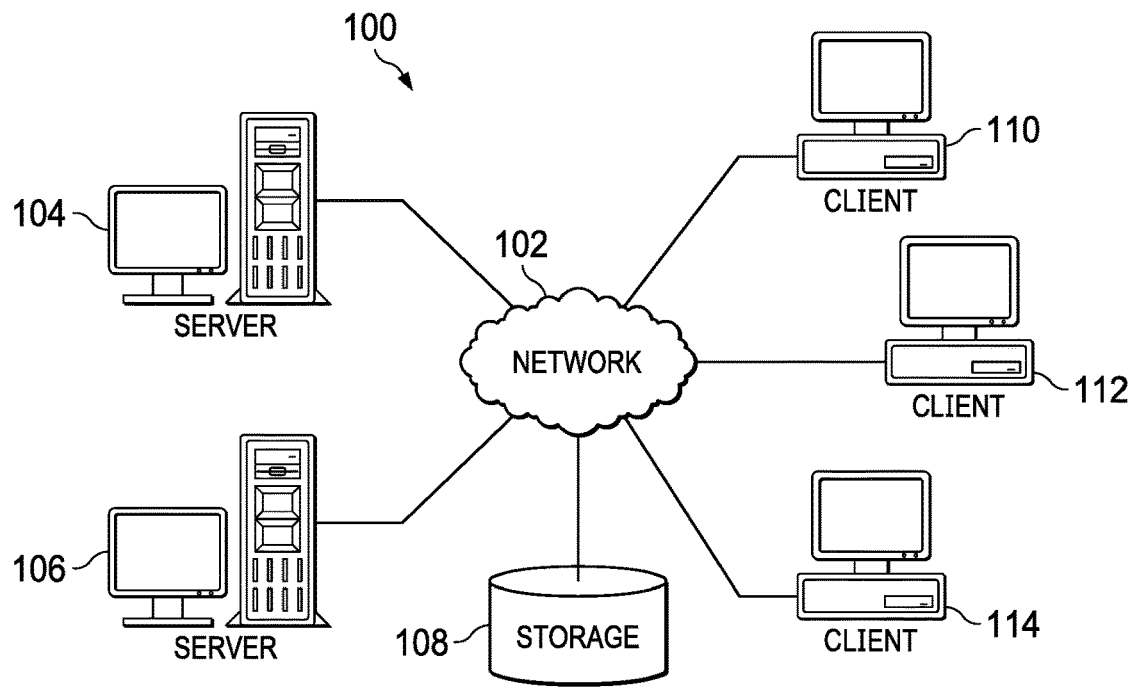
FIG. 1 depicts an exemplary block diagram of a distributed data processing environment in which exemplary aspects of the illustrative embodiments may be implemented.
Figure 2:
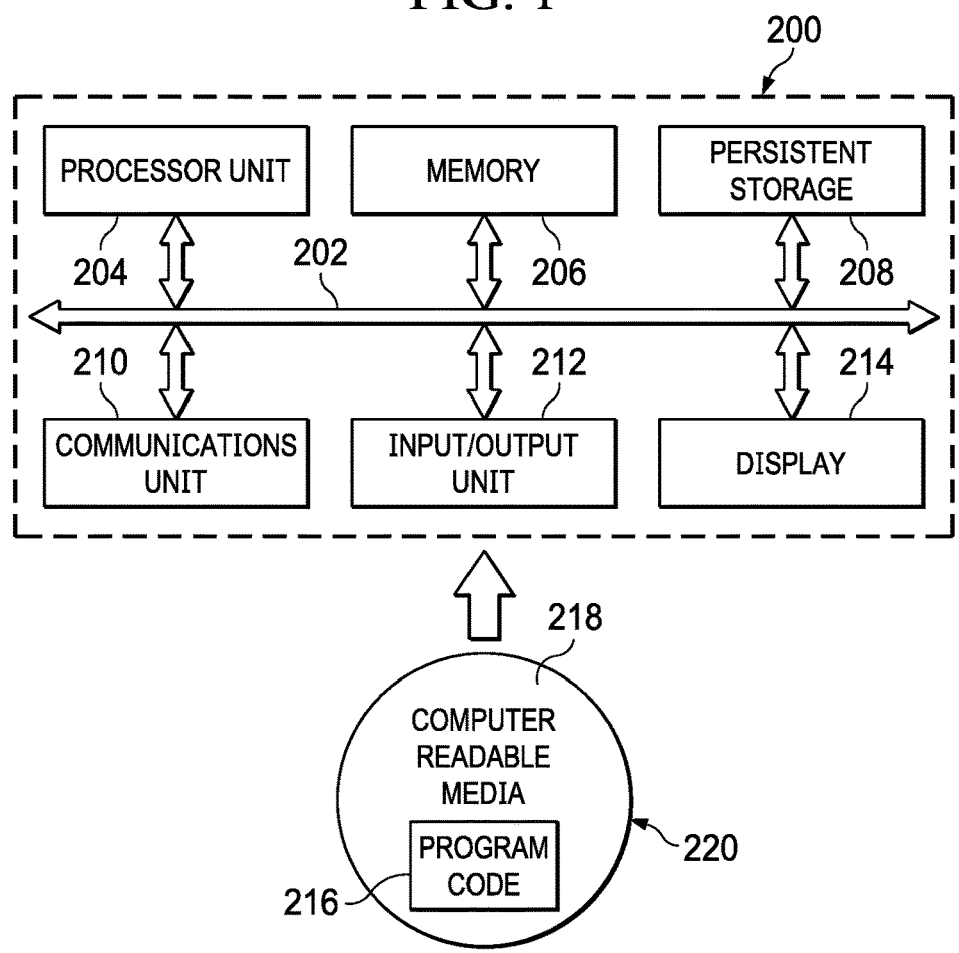
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary, and they are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts an exemplary distributed data processing system. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Security Intelligence Platform with Incident Forensics

Figure 3:
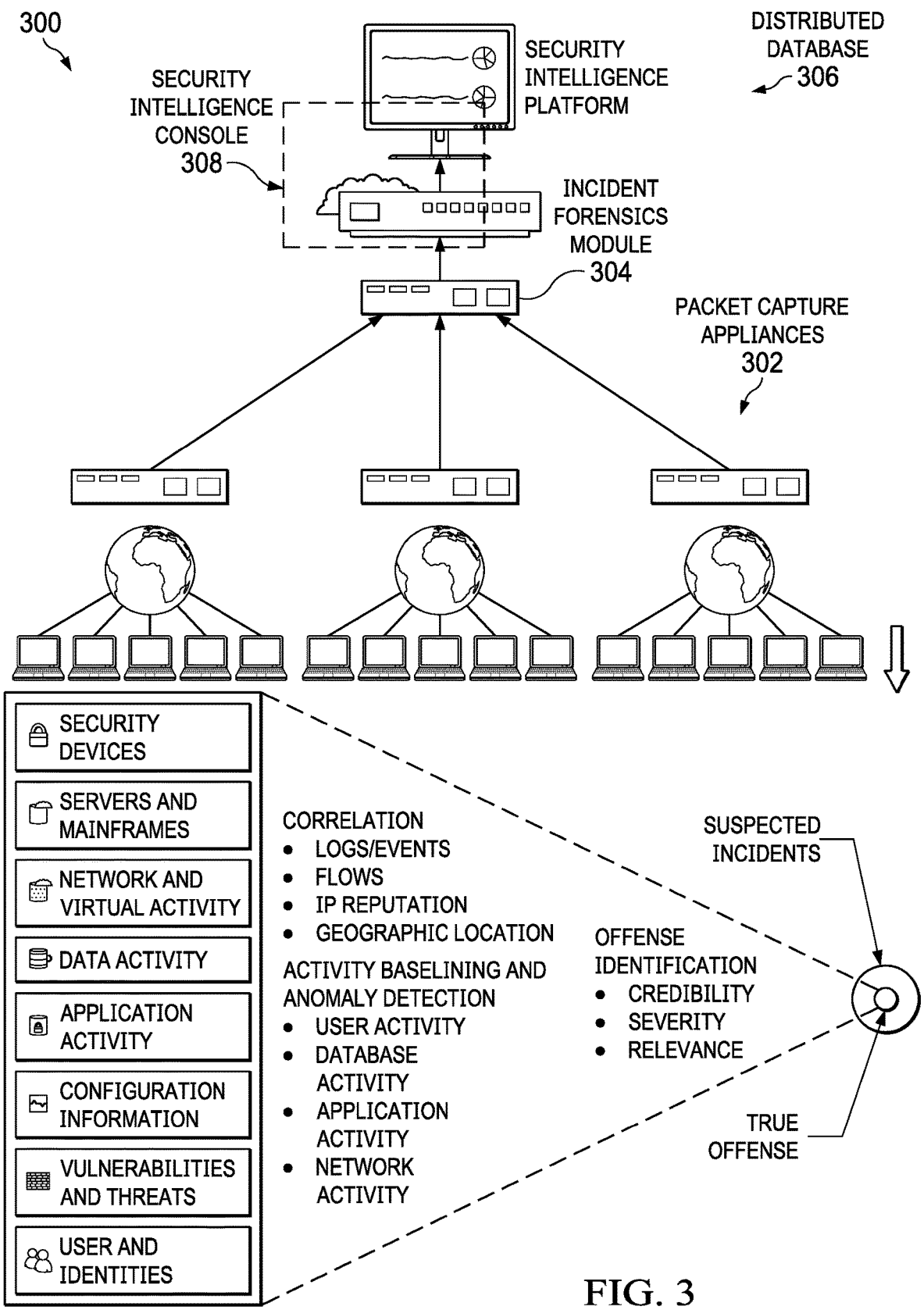
FIG. 3 illustrates a security intelligence platform in which the techniques of this disclosure may be practiced.

A representative security intelligence platform in which the techniques of this disclosure may be practiced is illustrated in FIG. 3.

Generally, the platform provides search-driven data exploration, session reconstruction, and forensics intelligence to assist security incident investigations. In pertinent part, the platform 300 comprises a set of packet capture appliances 302, an incident forensics module appliance 304, a distributed database 306, and a security intelligence console 308. The packet capture and module appliances are configured as network appliances, or they may be configured as virtual appliances. The packet capture appliances 302 are operative to capture packets off the network (using known packet capture (pcap) application programming interfaces (APIs) or other known techniques), and to provide such data (e.g., real-time log event and network flow) to the distributed database 306, where the data is stored and available for analysis by the forensics module 304 and the security intelligence console 308. A packet capture appliance operates in a session-oriented manner, capturing all packets in a flow, and indexing metadata and payloads to enable fast search-driven data exploration. The database 306 provides a forensics repository, which distributed and heterogeneous data sets comprising the information collected by the packet capture appliances. The console 308 provides a web- or cloud-accessible user interface (UI) that exposes a "Forensics" dashboard tab to facilitate an incident investigation workflow by an investigator. Using the dashboard, an investigator selects a security incident. The incident forensics module 304 retrieves all the packets (including metadata, payloads, etc.) for a selected security incident and reconstructs the session for analysis. A representative commercial product that implements an incident investigation workflow of this type is IBM® Security QRadar® Incident Forensics V7.2.3 (or higher). Using this platform, an investigator searches across the distributed and heterogeneous data sets stored in the database, and receives a unified search results list. The search results may be merged in a grid, and they can be visualized in a "digital impression" tool so that the user can explore relationships between identities.

Typically, an appliance for use in the above-described system is implemented is implemented as a network-connected, non-display device. For example, appliances built purposely for performing traditional middleware service oriented architecture (SOA) functions are prevalent across certain computer environments. SOA middleware appliances may simplify, help secure or accelerate XML and Web services deployments while extending an existing SOA infrastructure across an enterprise. The utilization of middleware-purposed hardware and a lightweight middleware stack can address the performance burden experienced by conventional software solutions. In addition, the appliance form-factor provides a secure, consumable packaging for implementing middleware SOA functions. One particular advantage that these types of devices provide is to offload processing from back-end systems. A network appliance of this type typically is a rack-mounted device. The device includes physical security that enables the appliance to serve as a secure vault for sensitive information. Typically, the appliance is manufactured, pre-loaded with software, and then deployed within or in association with an enterprise or other network operating environment; alternatively, the box may be positioned locally and then provisioned with standard or customized middleware virtual images that can be securely deployed and managed, e.g., within a private or an on premise cloud computing environment. The appliance may include hardware and firmware cryptographic support, possibly to encrypt data on hard disk.

Figure 4:
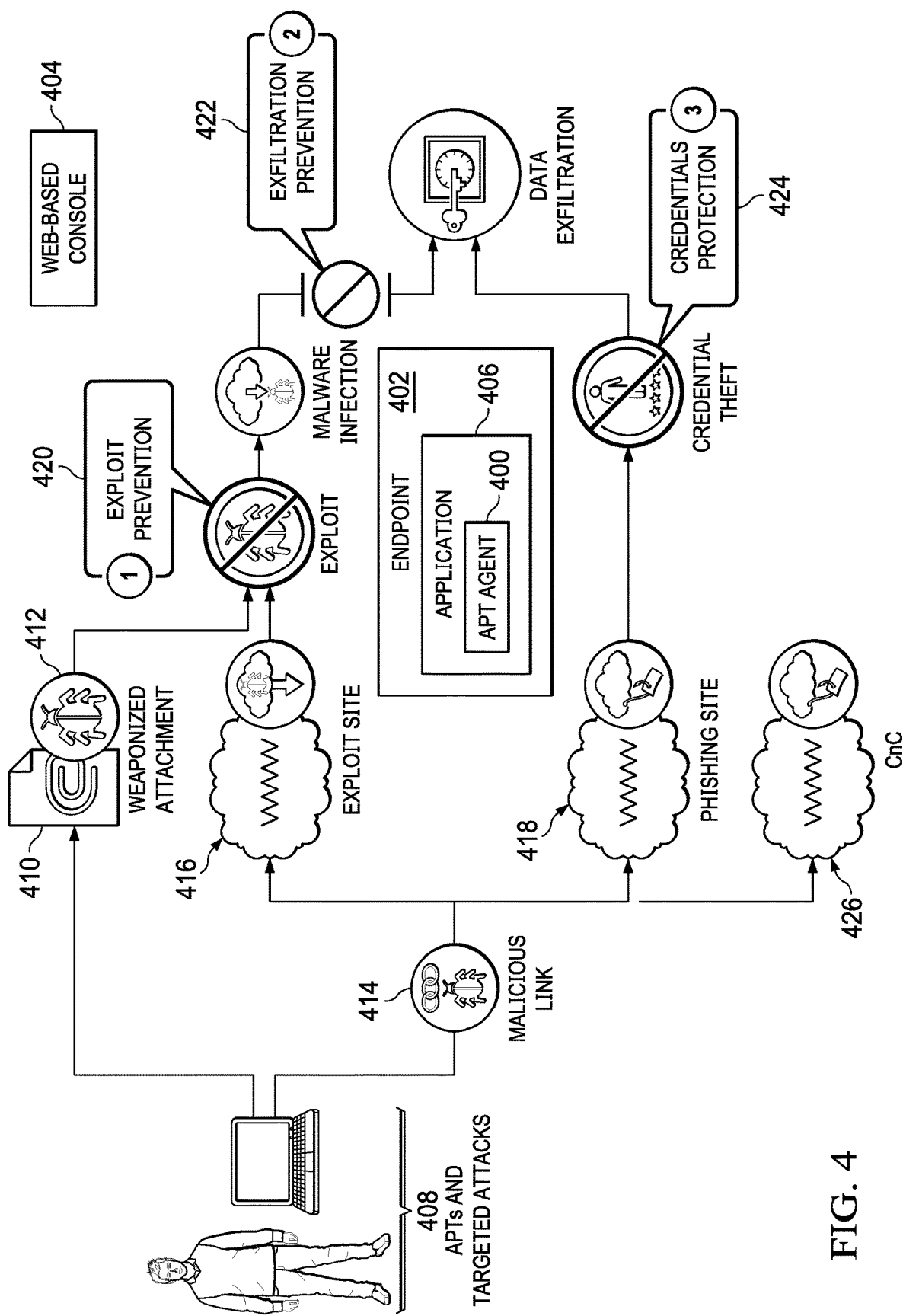
FIG. 4 depicts an Advanced Persistent Threat (APT) platform in which the techniques of this disclosure may be practiced.

An appliance of this type can facilitate Security Information Event Management (SIEM). For example, and as noted above, IBM® Security QRadar® STEM is an enterprise solution that includes packet data capture appliances that may be configured as appliances of this type. Such a device is operative, for example, to capture real-time Layer 4 network flow data from which Layer 7 application payloads may then be analyzed, e.g., using deep packet inspection and other technologies. It provides situational awareness and compliance support using a combination of flow-based network knowledge, security event correlation, and asset-based vulnerability assessment. In a basic QRadar STEM installation, the system such as shown in FIG. 4 is configured to collect event and flow data, and generate reports. A user (e.g., an SOC analyst) can then investigate offenses to determine the root cause of a network issue.

Generalizing, Security Information and Event Management (SIEM) tools provide a range of services for analyzing, managing, monitoring, and reporting on IT security events and vulnerabilities. Such services typically include collection of events regarding monitored accesses and unexpected occurrences across the data network, and analyzing them in a correlative context to determine their contribution to profiled higher-order security events. They may also include analysis of firewall configurations, network topology and connection visualization tools for viewing current and potential network traffic patterns, correlation of asset vulnerabilities with network configuration and traffic to identify active attack paths and high-risk assets, and support of policy compliance monitoring of network traffic, topology and vulnerability exposures. Some SIEM tools have the ability to build up a topology of managed network devices such as routers, firewalls, and switches based on a transformational analysis of device configurations processed through a common network information model. The result is a locational organization which can be used for simulations of security threats, operational analyses of firewall filters, and other applications. The primary device criteria, however, are entirely network- and network-configuration based. While there are a number of ways to launch a discovery capability for managed assets/systems, and while containment in the user interface is semi-automatically managed (that is, an approach through the user interface that allows for semi-automated, human-input-based placements with the topology, and its display and formatting, being data-driven based upon the discovery of both initial configurations and changes/deletions in the underlying network), nothing is provided in terms of placement analytics that produce fully-automated placement analyses and suggestions.

Advanced Persistent Threat (APT) Prevention

APT mitigation and prevention technologies are well-known. For example, IBM® Trusteer Apex® is an automated solution that prevents exploits and malware from compromising enterprise endpoints and extracting information. A solution of this type typically provides several layers of security, namely, exploit prevention, data exfiltration prevention, and credentials protection.

FIG. 4 depicts a typical embodiment, wherein the APT solution is architected generally as agent code 400 executing in enterprise endpoint 402, together with a web-based console 404 that enables IT security to manage the deployment (of both managed and unmanaged endpoints) from a central control position. The agent code 400 operates by monitoring an application state at the time the application 406 executes sensitive operations, e.g., writing a file to the file system. Generally, the agent 400 uses a whitelist of legitimate application states to verify that the sensitive operation is executed (or not) under a known, legitimate state. An exploit will attempt to execute sensitive operations under an unknown (not whitelisted) state, thus it will be stopped. The approach enables the APT agent to accurately detect and block both known and zero-day exploits, without knowing anything about the threat or the exploited vulnerability. The "agent" may be any code-based module, program, process, component, thread or the like.

FIG. 4 depicts how APT attacks typically unfold and the points at which the APT solution is operative to stop the intrusion. For example, here the attacker 408 uses a spear-phishing email 410 to send an employee a weaponized document, one that contains hidden exploit code 412. When the user opens the document with a viewer, such as Adobe Acrobat or Word, the exploit code runs and attaches to an application vulnerability to silently download malware on the employee computer 402. The employee is never aware of this download. Another option is to send a user a link 414 to a malicious site. It can be a malicious website 416 that contains an exploit code or a legitimate website that was compromised (e.g., through a watering hole attack). When the employee clicks the link and the browser renders the HTML content, the exploit code runs and latches onto a browser (or browser plug-in) vulnerability to silently download malware on the employee computer. The link can also direct the user to a phishing site (like a fake web app login page) 418 to convince the user to submit corporate credentials. After infecting the computer 402 with advanced malware or compromising corporate credentials, attacker 408 has established a foothold within the corporate network and then can advance the attack.

As depicted, the agent 400 protects the enterprise against such threats at several junctions: (1) exploit prevention 420 that prevents exploiting attempts from compromising user computers; (2) exfiltration prevention 422 that prevents malware from communicating with the attacker and sending out information if the machine is already infected with malware; and (3) credentials protection 424 that prevent users from using corporate credentials on non-approved corporate sites (including phishing or and public sites like social networks or e-commerce, for example). In one known approach, the agent performs these and related operations by monitoring the application and its operations using a whitelist of legitimate application states.

By way of additional background, information-stealing malware can be directly installed on endpoints by the user without requiring an exploit. To exfiltrate data, typically the malware must communicate with the Internet directly or through a compromised application process. Advanced malware uses a few evasion techniques to bypass detection. For example, it compromises another legitimate application process and might communicate with the attacker over legitimate websites (like Forums and Google Docs). The agent 400 is also operative to stop the execution of untrusted code that exhibits data exfiltration states. To this end, preferably it validates that only trusted programs are allowed to use data exfiltration techniques to communicate with external networks. The agent preferably uses several techniques to identify unauthorized exfiltration states and malicious communication channels, and blocks them. Because it monitors the activity on the host itself, it has good visibility and can accurately detect and block these exfiltration states.

The reference herein to the identified commercial product is not intended to be limiting, as the approach herein may be implemented with any APT solution or functionality (even if embedded in other systems).

Endpoint Inter-Process Activity Extraction and Pattern Matching

Figure 5:
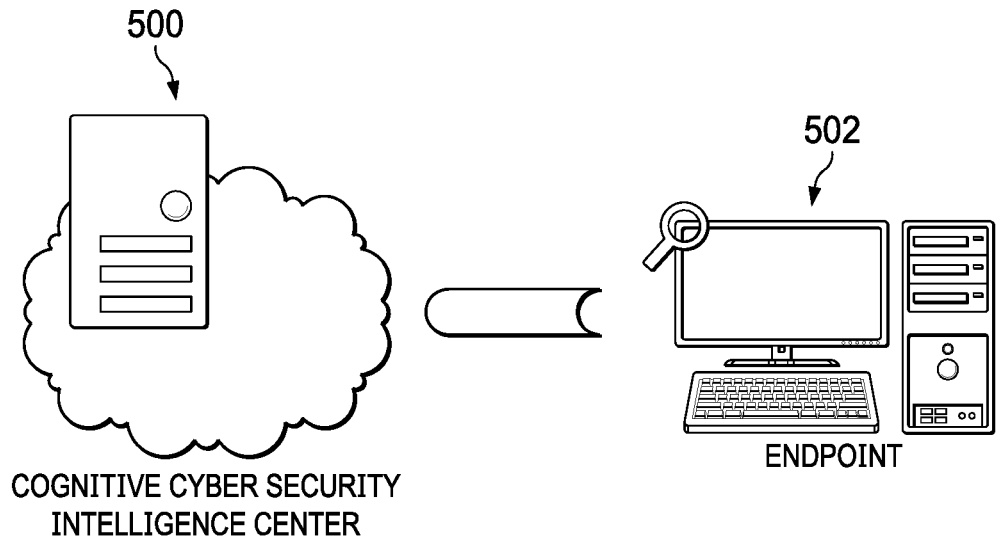
FIG. 5 illustrates an operating environment in which a cognitive cybersecurity intelligence center is used to manage an endpoint machine and in which the techniques of this disclosure may be implemented.

With the above as background, FIG. 5 depicts a basic operating environment that includes a cognitive cybersecurity intelligence center 500, and an endpoint 502. An endpoint 502 is a networked device that runs systems management code (software) that enables management and monitoring of the endpoint by the intelligence center 500.

The endpoint typically is a data processing system, such as described above in FIG. 2. The intelligence center 500 may be implemented as a security management platform such as depicted in FIG. 3, in association with an APT solution such as depicted in FIG. 4, or in other management solutions. Thus, for example, known commercial products and systems that provide endpoint management include IBM® BigFix®, which provides system administrators with remote control, patch management, software distribution, operating system deployment, network access protection and hardware and software inventory functionality. A commercial system of this type may be augmented to include the endpoint inter-process activity extraction and pattern matching techniques of this disclosure, or such techniques may be implemented in a product or system dedicated for this purpose.

In a typical implementation, an endpoint is a physical or virtual machine or device running an operating system such as Windows, Mac OSX, Vmware ESX, Linux, Unix, as various mobile operating systems such as Windows Phone, Symbian, iOS and Android. The cybersecurity intelligence center typically operates as a network-accessible security management platform comprising a plurality of machines and application software. Typically, the intelligence center supports cybersecurity analytics, e.g., using machine learning and the like. The intelligence center may operate in a dedicated manner to support a plurality of endpoints, or "as-a-service" on behalf of multiple enterprises each having their own endpoints. Typically, endpoint machines communicate with the intelligence center in a client-server paradigm, such as depicted in FIG. 1 and described above. The intelligence center may be located and accessed in a cloud-based operating environment.

As will be described, according to this disclosure inter-process events are sent from endpoints, such as endpoint 502, to a detection server executing in the intelligence center 500, where such events are analyzed. Preferably, attack detection occurs in the detection server. As will be seen, the approach herein provides for an efficient, systematic (as opposed to merely ad hoc) mechanism to record endpoint activities via inter-process events, to describe a malicious or suspicious behavior of interest with abstractions (network graphs), and to match concrete activities (as represented in the recorded events) with abstract patterns. This matching enables the system to act upon malicious/suspicious behaviors (e.g., by halting involved processes, alerting, dropping on-going network sessions, halting on-going disk operations, and the like), as well as to assist security analysts to locate interesting activities (e.g., threat hunting) or to determine a next step that may be implemented in a workflow to address the suspect or malicious activity.

According to the technique herein, both direct and indirect inter-process activities are extracted at endpoints and compared with pre-defined malicious behavior patterns for detection. Direct and indirect inter-process activities typically include control flow, such as process spawn, and information exchange via channels, such as files, sockets, messages, shared memory and the like. Inter-process activities reveal goals of processes and their particular execution paths. In the approach herein, they are matched against malicious inter-process behaviors for detecting attack instances. Preferably, the malicious behavior patterns are pre-defined with abstraction to characterize key steps in cyberattacks. These malicious behavior patterns typically are stored in an endpoint, and they can be updated as necessary.

Figure 6:
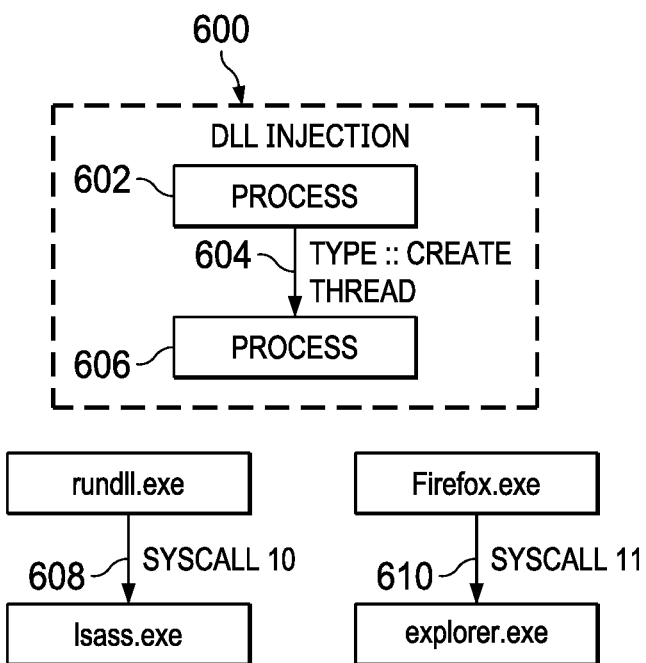
FIG. 6 depicts a representative malicious behavior graph abstraction, and several inter-process activity graphs that are matched to the graph abstraction.

FIG. 6 depicts how graphs are used to facilitate behavior-based detection/reasoning according to the techniques herein. In this approach, typically an individual (e.g., a software developer, a security analyst, or the like) describes a malicious or interesting behavior in an abstract graph pattern 600. In this injection, a DLL injection attack is modeled by a process 602 that executes an event (Type—create thread) 604, which then spawns another process 606. Generalizing, the graph pattern 600 comprises nodes (in this example processes 602 and 606), and edges (in this example, the event 604 that links the two nodes). In operation, a pattern matching algorithm may then return concrete activities on a host endpoint that match the pattern. The concrete activities on the endpoint preferably are also modeled by graphs to facilitate pattern matching. Two such example activity graphs 608 and 610 derived from the endpoint inter-process activity and that match the abstract graph behavior 600 are depicted. In the first example activity graph 608, process rundll.exe executing event Syscall 10 spawns process lsass.exe; in the second example activity graph 610, process Firefox.exe executing event Syscall 11 spawns process explorer.exe. This is an example of topology matching.

Figure 7:
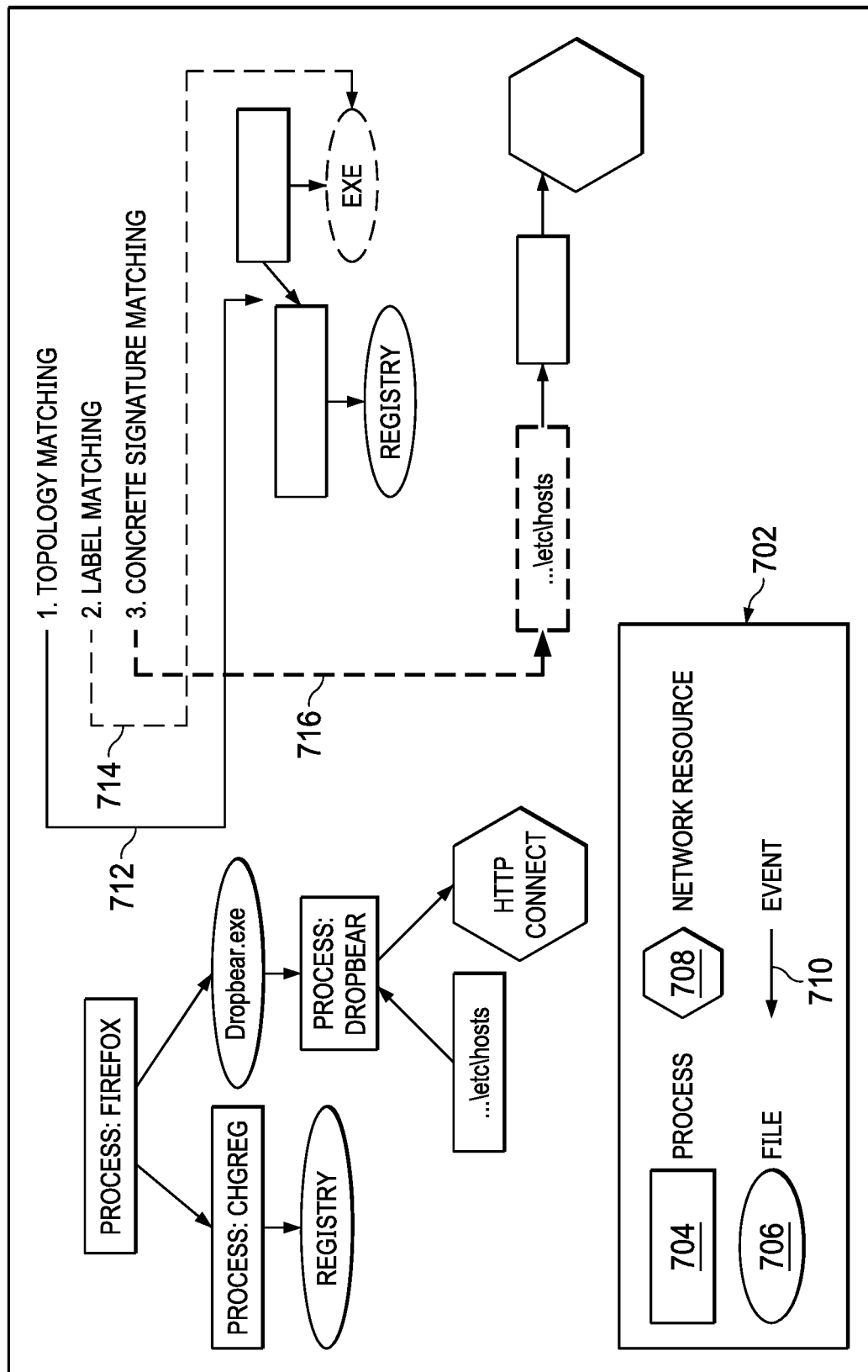
FIG. 7 depicts a representative inter-process graph constructed by monitoring activities among entities in an endpoint, and how various matching techniques are executed against that graph by an endpoint protection system according to the techniques herein.

FIG. 7 depicts a more complex example wherein as a result of inter-process activity monitoring, the graph 700 is generated. As depicted in the legend 702, typically a graph comprises a set of entities, namely a process 704, a file 706, a network resource 708, and an event 710. Preferably, each entity in the endpoint system is associated with a label (or "tag") that describes its category and properties, e.g., the installed Firefox (a process entity) is a "browser," the installed Firefox is "64-bit," and so forth. Labels may be assigned manually, e.g., "browser," generated automatically, e.g., if it is a 64-bit executable, or computed via a function, e.g., the label "trusted" is assign if the process meet certain requirements. Labels may replace entity names to create behavior patterns for a category of processes. The graph 700 is FIG. 7 depicts and comprises a set of entities, each of which typically has an associated label (tag) that is defined in an off-line manner. Inter-process activity is monitored on the endpoint, with activities among entities being recorded, e.g., via system call monitoring, kernel hooking, system monitoring services, and so forth. Typically, a relatively constrained set of system calls or events need to be monitored to obtain the information need to construct a graph. One example (given Linux as the operating system) would be system calls that associate one entity with another, e.g., sys_open and stub_execve. A graph typically is constructed (and updated as necessary) by connecting entities and monitored activities, with an example being graph 700. Preferably, the graph is stored on disk and cached in memory.

Generalizing, the activity graph represents real-time inter-process activity extraction that occurs at the endpoint. As also depicted in FIG. 7, this extraction then facilitates behavior matching (which typically occurs in the detection server executing in the intelligence center) using one or more matching techniques. These matching techniques typically include one or more topology matching 712, label matching 714, and optionally concrete signature matching 716 As noted above, inter-process activities (and their associated labeling) as depicted in the graph reveal goals of one or more processes, as well as their particular execution paths. Matching the generated graph(s) with malicious inter-process behaviors (also defined in the form of graphs) enables the system to detect and address attack instances. As noted, preferably the malicious behavior patterns are pre-defined with some degree of abstraction to characterize key steps in a cyberattack.

More formally, and as used herein, an abstract pattern graph (such as graph 600 in FIG. 6) against which monitored inter-process activity is compared is sometimes referred to herein as a pattern graph (PG). A PG may include one or more constraints, wherein a constraint typically is a Boolean function on elements or relations of elements of the graph. Typically, there are two types of constraints, namely, single element constraints (e.g., properties/classes/concepts of a vertex/edge in a pattern graph PG), and one or more element relation constraints (i.e. how one element relates to another, e.g., direct connection, latter than, connect with "n" steps, as so forth). The monitored activities of a host (endpoint) are instantiated in a graph that is sometimes referred to herein as an activity graph (AG). In FIG. 6, graphs 608 and 610 represent an AG. As will be described, a goal of pattern matching then is to search for all subgraphs of AG that satisfy PG. As will be further described below, it is assumed that querying a database to verify a single element constraint or one element relation constraints are practical; a remaining task then is to provide for multi-constraint graph solutions, namely, how to orchestrate database query generation to satisfy all constraints efficiently. A technique associated with this disclosure addresses this problem, as will be described below.

Figure 8:
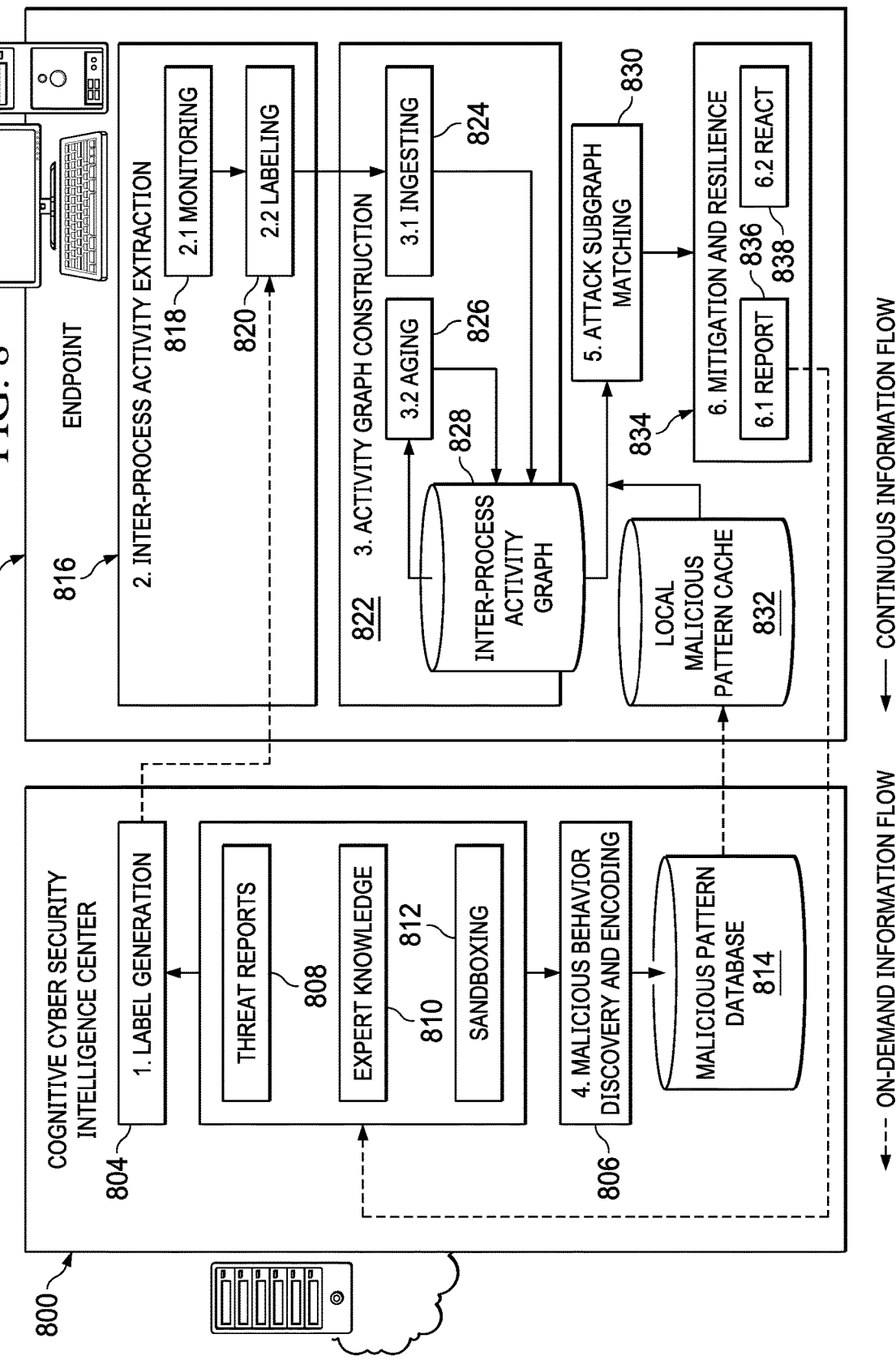
FIG. 8 depicts an implementation of an endpoint inter-process activity extraction and pattern matching system of this disclosure.

FIG. 8 depicts a representative embodiment of a detection system in which the endpoint inter-process activity extraction and pattern matching technique of this disclosure is practiced. As depicted, certain functionality is located in the intelligence center 800 (e.g., the security management platform, an APT solution, an endpoint management solution, etc.), while certain functionality is located in the endpoint 802. This arrangement of functionality is preferred, but it is not intended to be limited. As noted above, the intelligence center 800 may be dedicated to the network of endpoints (e.g., located within an enterprise), or it may operate as a service provider (or, more generally, a "service") on behalf of multiple enterprises, each having their own set of endpoints. In a typical implementation, the cybersecurity intelligence center is network-accessible and is deployed in a cloud-based operating environment, although this is not a limitation. Further, typically each function block identified in FIG. 8 is executed in software, i.e., as a set of computer program instructions executed in a processor. It should be appreciated that the functions identified in FIG. 8 are provided for purposes of explanation only, and that certain of these functions may be combined or otherwise re-configured as necessary.

As depicted, the intelligence center 800 performs several functions, namely, label generation 804 (step 1), and malicious behavior discovery and encoding 806 (step (4)). As depicted, typically these activities are informed by and based on existing attack information available in the intelligence center, e.g., threat reports 808, expert knowledge 810 and information derived from sandboxing and evaluating threats 812. This set of information typically is available to or otherwise obtained by security analysts. As described above with respect to FIG. 7, in label generation 804, each entity in the endpoint system is associated with one or more labels that describe its category and properties. The labels are applied manually, automatically, programmatically, etc., or by some combination. The label generation 804 may be carried out periodically, or upon a given occurrence. The malicious behavior discovery and encoding 806 derives malicious (or otherwise suspect) graph patterns from existing attacks. As noted, typically these patterns are determined by human analysts, other security detection mechanisms, machine learning systems, or combinations thereof. As also depicted, a set of malicious patterns generated from the knowledge base of attack source (808, 810, 812) is stored in a malicious pattern database 814.

Turning to the endpoint functions 802, function block 816 (step 2) represents inter-process activity extraction, which typically involves monitoring 818 (step 2.1), and labeling 820 (step 2.2). The monitoring function records activities among entities, e.g. via system call monitoring, kernel hooking, system monitoring services and the like. Thus, the monitoring function 818 may leverage existing endpoint service functionality. As noted, it is not required that the monitoring 818 monitor all system calls or events, and the calls and events to be monitored is configurable as needed. Step 2.2, the labeling function, takes a behavior signature created by the labeling function (step 1) and builds an abstract/labelled behavior signature. This abstraction is desirable, as the abstract/labelled behavior signature expresses attack logic in a more general manner and thus covers one or more attack variants for a specific attack, and it enables the efficient matching of labels or concrete vertices/edges during subsequent matching operations (described below).

Function block 822 (step 3) provides activity graph construction. As will be described, this processing typically involves ingesting 824 (step 3.1), which extends the graph as new activities occur and are monitored, and aging 826 (step 3.2), whereby vertices/edges of the graph are dropped (pruned) if they are older than a configurable threshold, or if their distance(s) to a newly-extended graph are larger than a configurable threshold. The inter-process activity graph generated by these activity graph construction function 822 is stored in a database 828. Typically, the inter-process activity graph evolves as the monitoring, ingesting and aging functions operate, preferably on a continuous basis.

As also depicted, the endpoint supports an attack sub-graph matching function 830 (step 5). Using this function, the endpoint protection system continuously performs graph pattern matching between the evolving inter-process activity graph, and the malicious behavior graph patterns. These patterns are provided by the malicious pattern database 814 in the intelligence center 800 and stored in a local malicious pattern cache 832. As described above, the attack subgraph matching function searches for graph substructure that matches the malicious behavior graph pattern(s) stored in the local cache 832. Thus, in this approach, the endpoint detection system functionality compares the evolving activity graph with the malicious inter-process graph patterns. Based on this matching, a mitigation and resilience function 834 (step 6) may then be called. Function 834 comprises a report function 836 (step 6.1), and a react function 838 (step 6.2). The function 834 thus provides for post-detection operations, which typically comprises halting the involved processes, alerting, moving the involved processes to a sandbox for further evaluation, dropping on-going network sessions, halting on-going disk operations, handing off the matched subgraph to a user to decide a next step, submitting the matched subgraph to a security analyst for further study, training a machine learning classifier, and so forth. These are merely representative post-detection operations.

As depicted in FIG. 8, the mitigation and resilience function 834 typically interacts with the intelligence center 800 in an on-demand manner, whereas information flow within the endpoint functions typically is continuous. Although this is the preferred approach, it is not intended to be limiting, as one or more functions in the endpoint may be carried out on periodically, in response to an occurrence, or on-demand.

Thus, the technique of this disclosure provides for a robust method to monitor and protect an endpoint by recording inter-process events, creating an inter-process activity graph based on the recorded inter-process events, matching the inter-process activity (as represented in the activity graph) against known malicious or suspicious behavior (as embodied in a set of pattern graphs), and performing a post-detection operation in response to a match between an inter-process activity and a known malicious or suspicious behavior pattern. Preferably, matching involves matching a subgraph in the activity graph with a known malicious or suspicious behavior pattern as represented in the pattern graph. During this processing, preferably both direct and indirect inter-process activities at the endpoint (or across a set of endpoints) are compared to the known behavior patterns.

The following provides additional details regarding various operations (functions) of the detection system described above.

Figure 9:
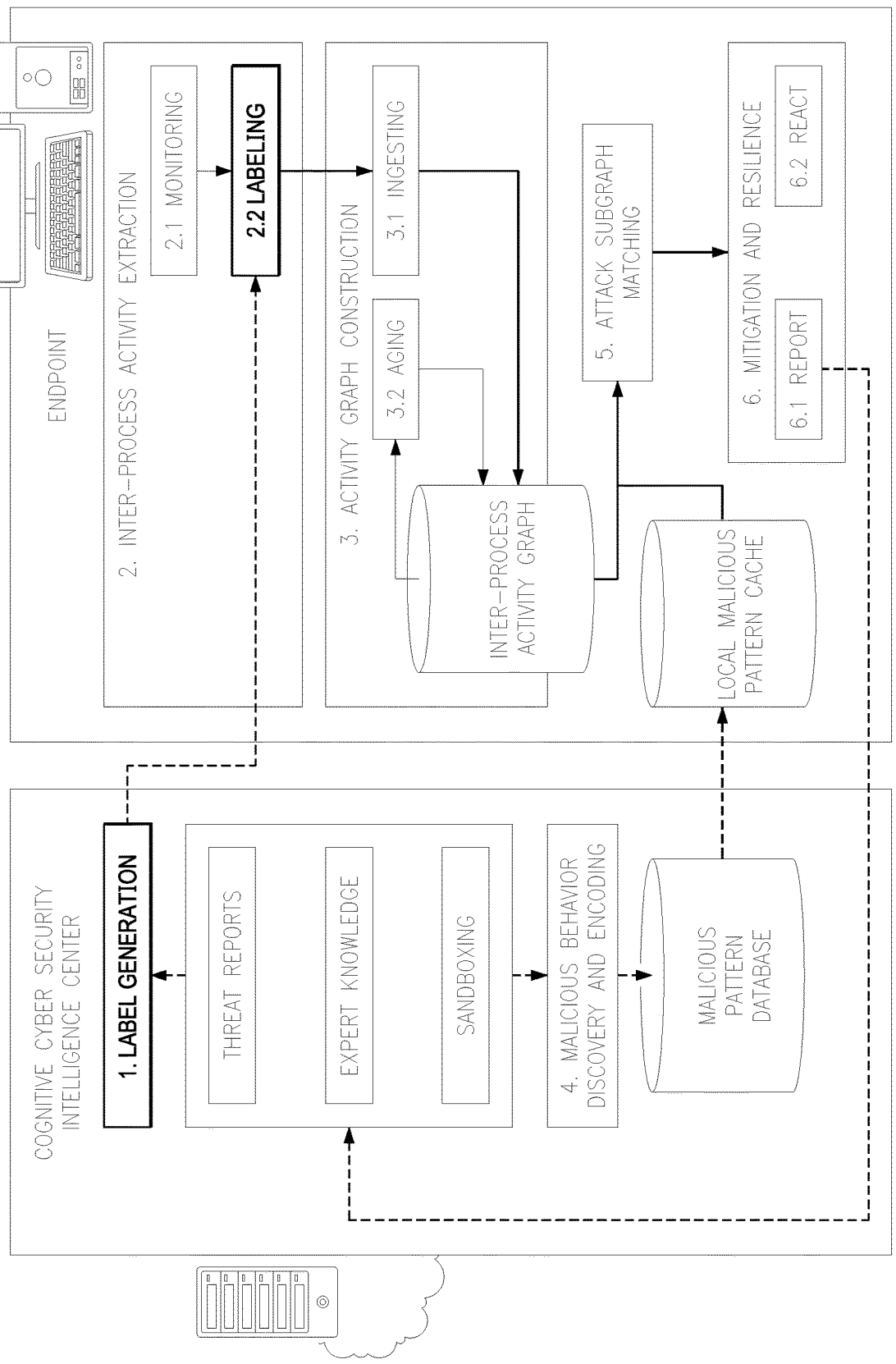
FIG. 9 depicts how labelled subgraph matching is implemented in a preferred embodiment.

FIG. 9 depicts how labelled subgraph matching is implemented in a preferred embodiment. As described above, and as depicted, the label generation (step 1) typically occurs in the intelligence center, and a labelling function (step 2.2) is carried out in the endpoint. In this approach, preferably a concrete signature (e.g., which is available to the system, e.g., by virtue of prior attack data, or otherwise) is converted to a behavior signature (concrete) (in step 1), which is then converted to an abstract/labelled behavior signature (in step 2.2). This technique facilitates labelled subgraph matching, because an abstract/labelled behavior signature expresses general attack logic (as opposed to just some specific attack flow). In particular, an abstract/labelled behavior signature is matched (e.g., by its labels or by concrete vertices/edges) during the attack subgraph matching. By expressing the attack logic, the graph-based behavior signature covers more attack variants than ad hoc approaches that use simple concrete inter-process behavior signatures.

Figure 10:
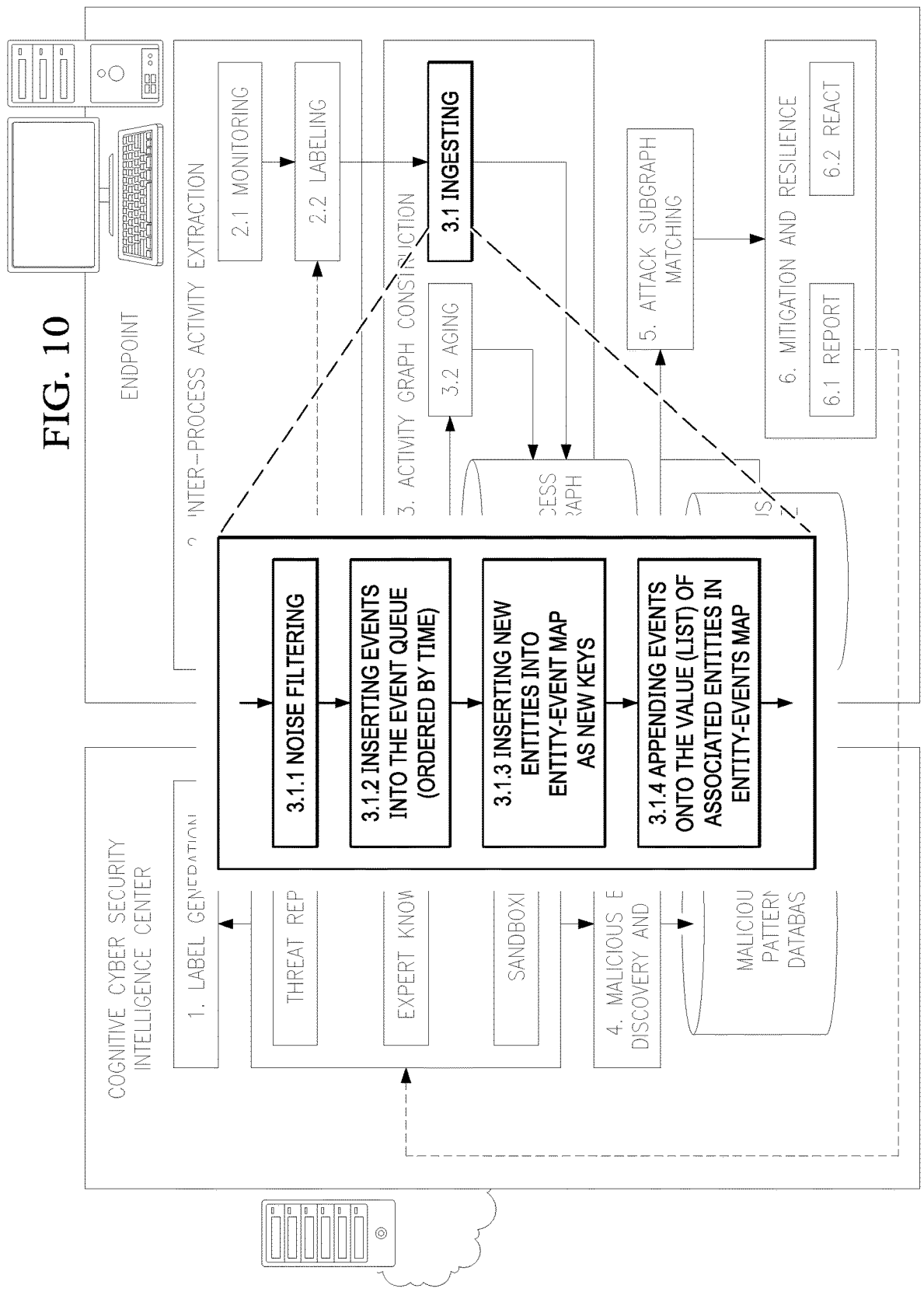
FIG. 10 depicts the ingesting function in additional detail.

FIG. 10 depicts the ingesting function (step 3.1) in additional detail. As depicted, the ingest function begins by filtering noise (step 3.1.1), after which events are inserted into an event queue, ordered by time (step 3.1.2). Then, and to facilities evolving the inter-activity graph, new entities are inserted into an entity-event map, preferably as new keys (step 3.1.3). As additional events are received, these events are then appended onto the value (list) of associated entities in the entity-event map (step 3.1.4).

Figure 11:
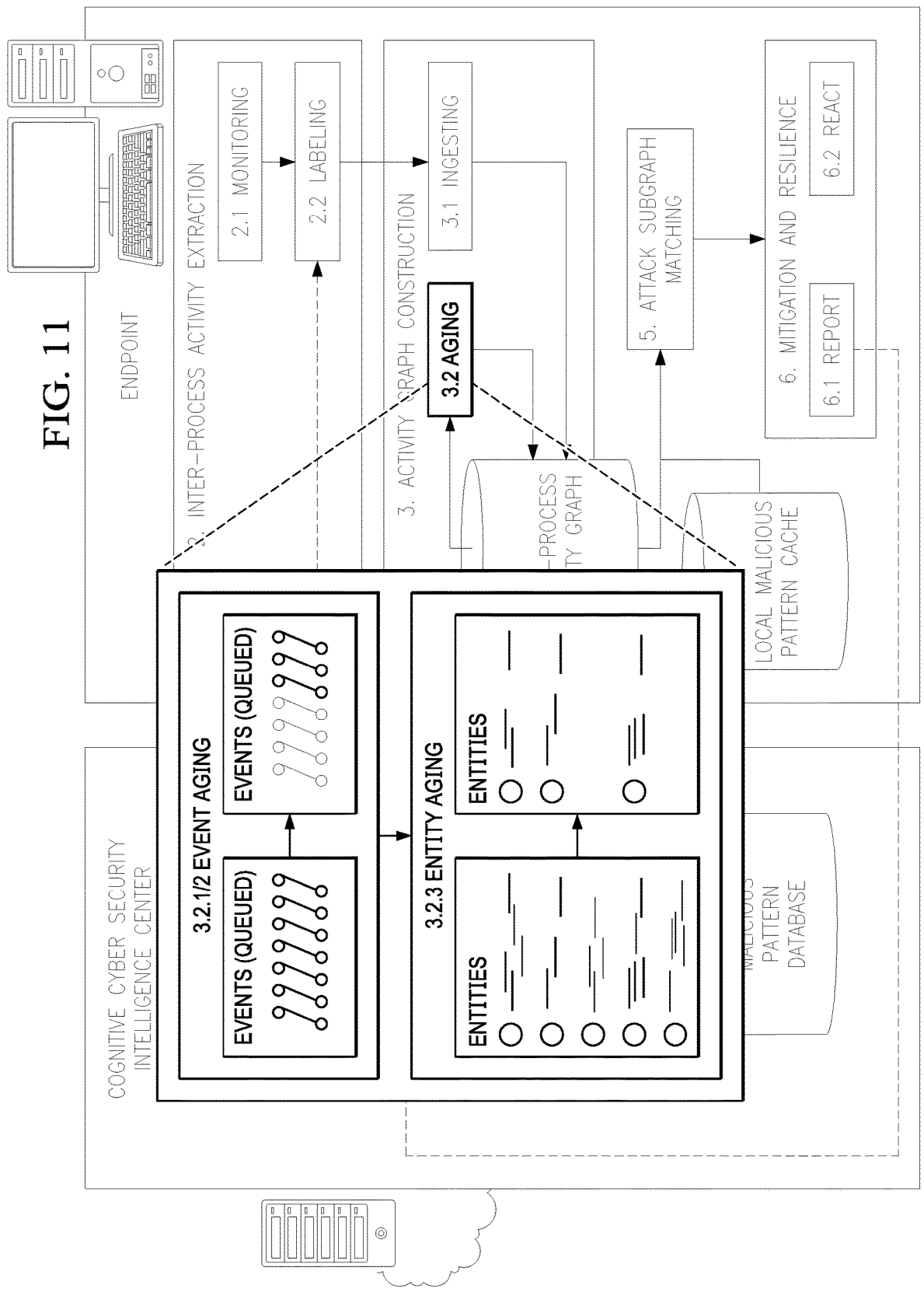
FIG. 11 depicts how the aging function is used to evolve an activity graph.
Figure 12:
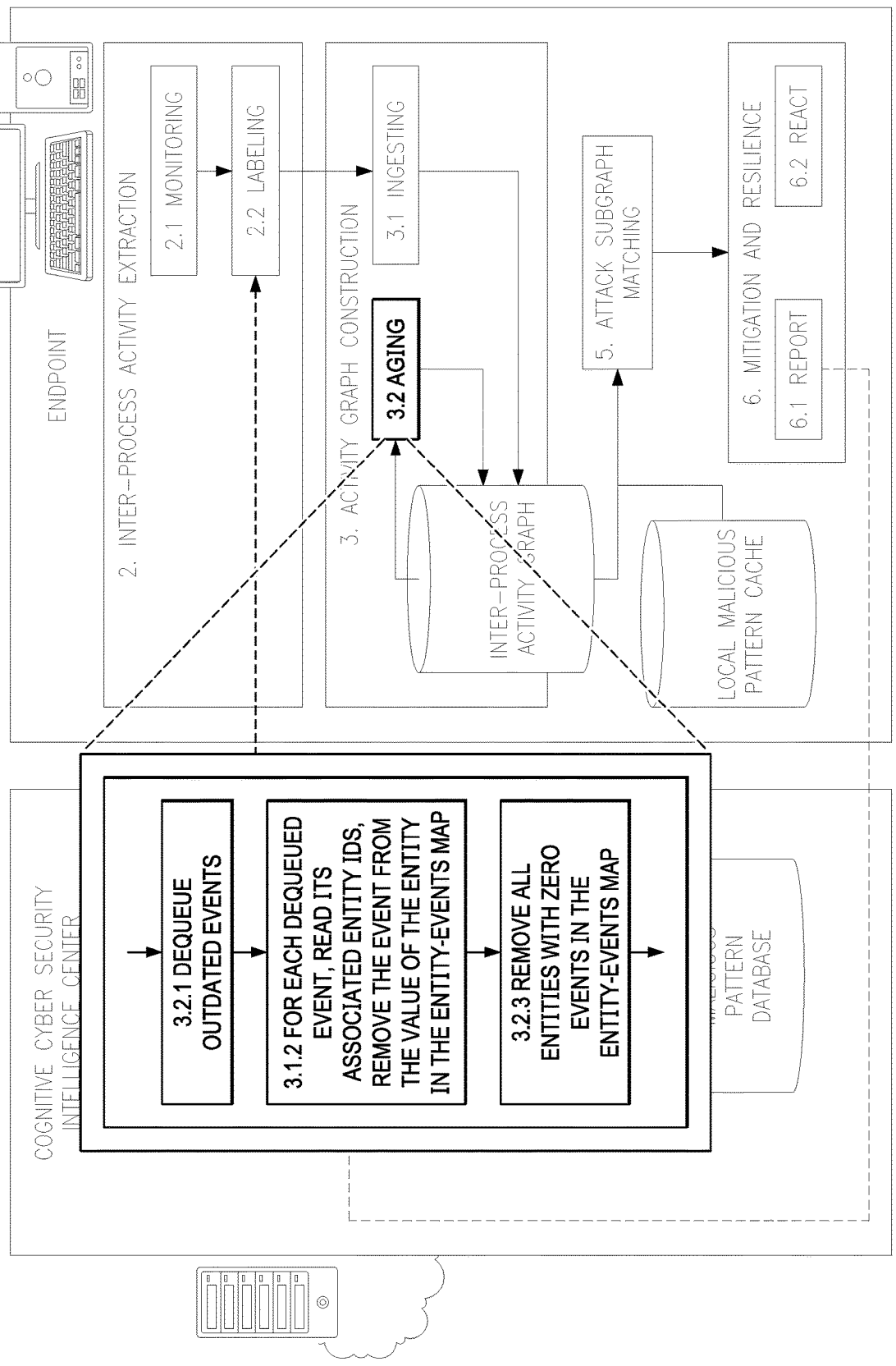
FIG. 12 depicts the aging function in additional detail.

FIG. 11 and FIG. 12 depict and describe how the aging function is used to evolve an activity graph. FIG. 11 shows an entity-event map at two (2) distinct times (initially, and then following application of the aging function). As depicted, as events are discovered (received), they are queued to an event queue 1100 and represented in the entity 1102. The resulting entity-event map is shown on the left side of the drawing. As given events age, they are pruned (de-queued) from the event queue, and the affected entity likewise is updated. This updated entity-event map is represented on the right side of the drawing. FIG. 12 depicts these operations in a process flow. Thus, in step 3.2.1 outdated events are dequeued. At step 3.1.2, and for each dequeued event, its associated entity identifier (id) is read, and the event is removed from the value of that entity in the entity-events map. At step 3.2.3, all entities with zero events are removed in the entity-events map.

Figure 13:
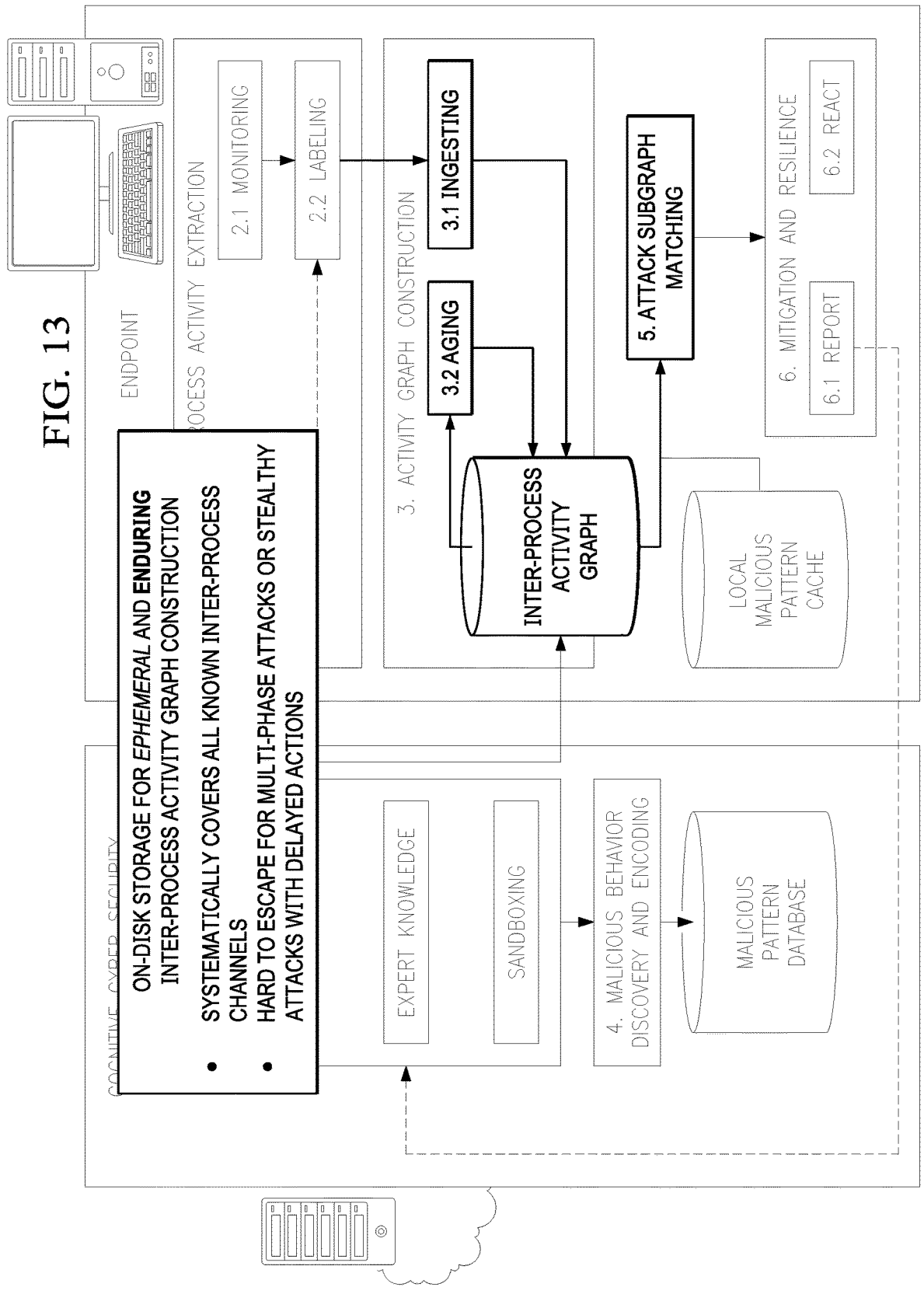
FIG. 13 depicts how the detection system provides indirect inter-process activity modeling using on-disk storage for ephemeral and enduring inter-process activities.

FIG. 13 depicts how the detection system provides indirect inter-process activity modeling, preferably using on-disk storage for ephemeral and enduring inter-process activities. As shown, the ingesting function (step 3.1) and the aging function (step 3.2) facilitate the building of the inter-process activity graph to facilitate the attack subgraph modeling (step 5). During these operations, on-disk storage for both ephemeral and enduring inter-process activity graph construction ensures that all known inter-process channels are systematically covered. The approach further ensures that multi-phase attacks, or stealthy attacks with delayed actions, do not escape discovery.

Figure 14:
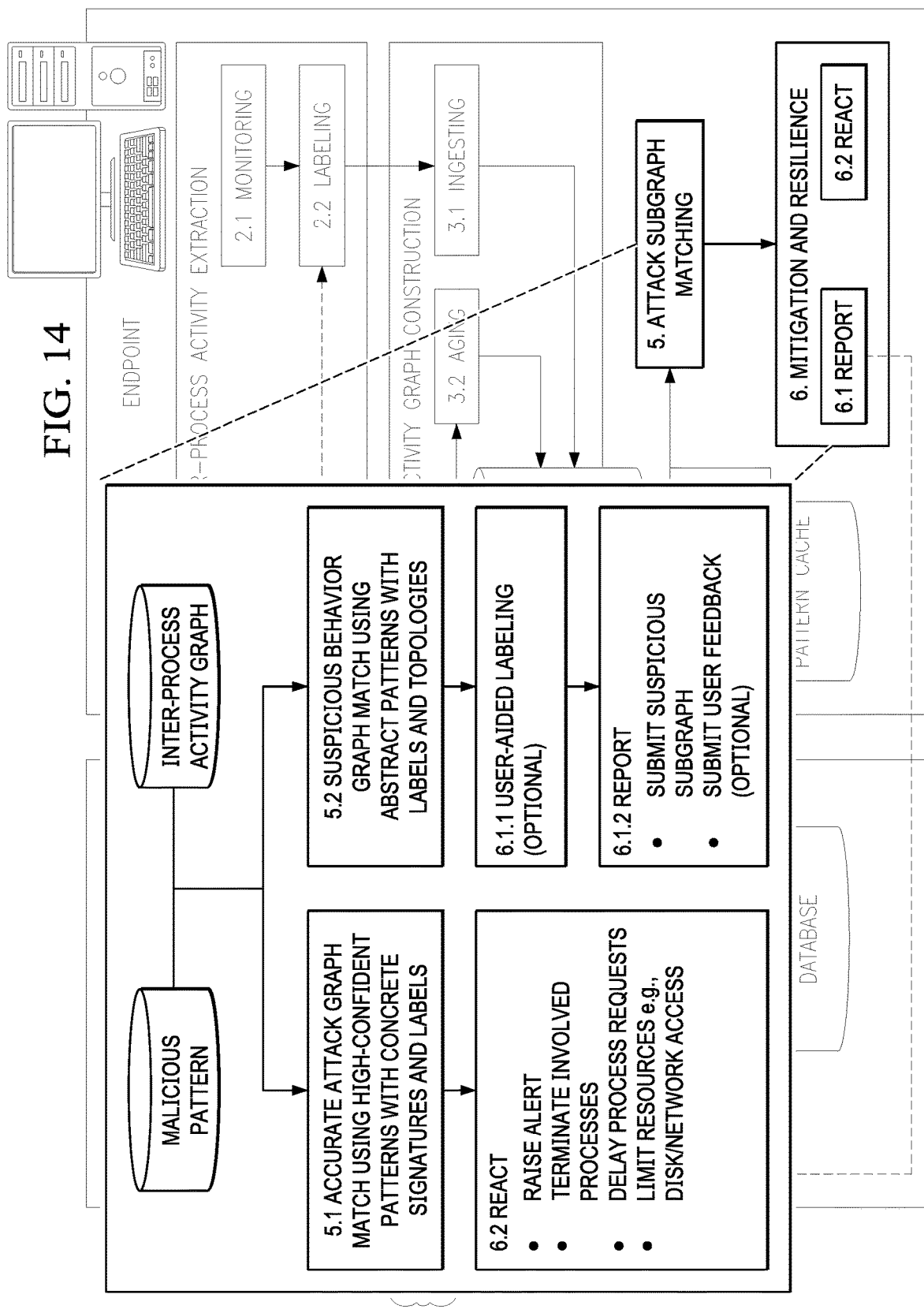
FIG. 14 depicts additional details regarding the matching function, and the mitigation and resilience function, in FIG. 8.

FIG. 14 depicts additional details regarding the matching function (step 5 in FIG. 8), and the mitigation and resilience function (step 6 in FIG. 8). Step 5.1 represents a malicious behavior match with high confidence, typically based on concrete signatures and labels. When a malicious behavior match of this type occurs, typically one or more of the operations identified in the react function (step 6.2) are carried out. Step 5.2 represents a suspicious behavior match, typically based on using abstract patterns with labels and topologies. When a suspicious behavior match of this type occurs, typically user-aided labelling (step 6.1.1) is done, followed by one or more reporting operations (step 6.1.2). The user-aided labelling operation is optional.

There is no requirement that any specific algorithm be implemented for behavior discovery, or for behavior signature matching. Rather, the system approach as described above provides a systematic approach to detect complex and/or long-lasting cyberattacks that arise based on direct and indirect inter-process activities.

A pattern graph (PG) (such as graph 600 in FIG. 6) may be specified visually (i.e., by drawing a graph), although this is not a requirement. A pattern graph (or graph pattern) also may be specified in other ways, e.g., by a program language.

The following provides additional details regarding the activity graph (AG) construct as described above. The activity graph typically expresses computations on one or more computing devices (which may include the endpoint) as a temporal graph. As such, the activity graph is also sometimes referred to herein as a computation graph (CG), as it represents an abstraction of the computations. The notion of an "activity graph" and a "connection graph" are used herein synonymously. As previously described, the basic elements of a AG/CG are entities (e.g., processes, files, network sockets, registry keys, GPS sensor, accelerometer, etc.), and events (e.g., file read, process fork, etc.). An entity is any system element that can either send or receive information. An event is any information/control flow that connects two or more entities. Events typically are information flows between pair of entities at specific times. Events can be captured in the form of system calls, etc. An event has a unique timestamp (when it happens), and an information flow direction (directional, bi-directional, non-directional). An indegree entity of an event can be one or two entities of the event based on its direction. An outdegree entity of an event can be one or two entities of the event based on its direction. A timestamp is an integer or real number that records the time of an event, and a joinpoint (or checkpoint) is a tuple of <entity, timestamp>.

Thus, an AG/CG references a history of computation including any entities or events associated with attacks or threats. Security-related data, such as alerts, IOCs, and intermediate threat analysis results are subgraphs, which can be denoted as labels on elements of a AG/CG, where typically an element is an alias referencing an entity or an event. As a result, threat detection is a graph computation problem whose solution it to iteratively deduce threat-inducing subgraphs in a AG/CG.

More generally, and as used herein, an activity graph is a labeled semi-directed temporal graph that objectively records both intrusive and non-intrusive computations on computing devices, together with any security knowledge associated with the computations. A particular label on the graph typically denotes one of several categories, e.g. the labels: element attribute, element relation, and security knowledge. An element attribute label is objective information derived from computation recording (as has been described above); this type of label identifies a set of elements with a particular attribute, e.g., an event type READ. An element relation label is objective information derived from computation recording; this type of label expresses some relation among a set of elements, e.g., a provenance linkage between READ and WRITE events of a process, which connects a large number of READ/WRITE events. This label embeds finer-grained provenance information into an inter-process level PG. A security knowledge label (when used) is subjective information regarding the security and privacy goals and reasoning procedures; a label of this type marks a group of elements with some security knowledge. A security knowledge label can be generated as either intermediate/final results of threat deduction, or organization policies, IOCs, or anomaly scores imported from external detection systems, e.g., a set of confidential files, or IP addresses marked as command and control servers.

Enterprises and organizations typically inspect computations at multiple levels for threat discovery. An AG/CG typically describes computations at a selected monitoring level, such as network, host or process level. Given a monitoring level, e.g., network, the activities within an entity, e.g., process communications within a host, are usually out of the monitoring scope and not expressed in the CG. Finer-grained computation information typically is either expressed in a lower-level CG, e.g., a CG at the host level, or embedded into the CG as labels, e.g., provenance labels.

Figure 15:
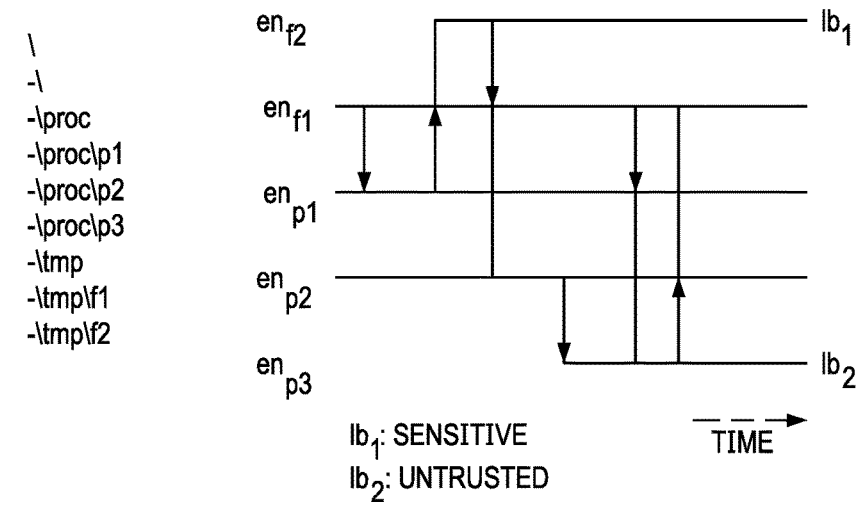
FIG. 15 depicts a representative activity graph for host level activities.

FIG. 15 depicts a representative host-level AG/CG, e.g., processes and files. FIG. 15 (and FIGS. 16-17 that follow) represent computation history as a temporal grid, wherein a horizontal line represents an entity, and wherein a vertical line represents an event.

In FIG. 15, system activities are logged, e.g., via syscall monitoring and program instrumentation. Entities (en) in this CG consist of subjects (e.g., processes and threads) and objects (e.g., files, pipes, and network sockets). In this example, security data is embedded in labels: $lb_1$: sensitive indicates that $en_{f2}$ contains sensitive information, and $lb_2$: untrusted indicates that $en_{p3}$ is not certified by the company. In this example, data leakage occurs when $en_{p3}$ can be traversed from $en_{f2}$, as shown in FIG. 15.

Figure 16:
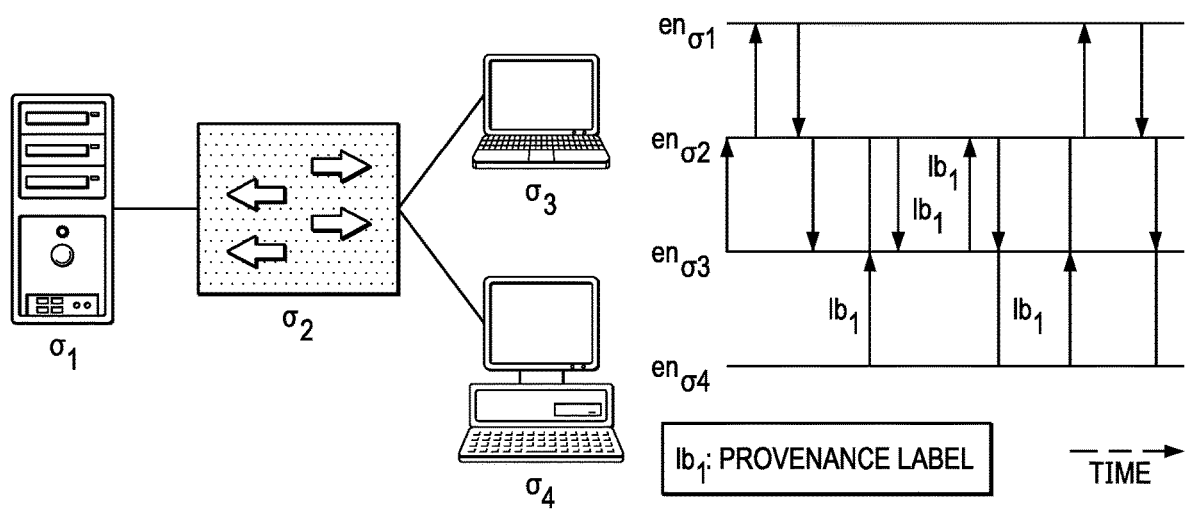
FIG. 16 depicts a representative activity graph for a network level activities.

FIG. 16 depicts a representative AG/CG at network level. In this example, the metadata of link layer communications of a small network is logged for threat intelligence computing. As depicted, $lb_1$ is a provenance label linking four events among entities $en_{o2}$, $en_{o3}$ and $en_{o4}$. The link $lb_1$ helps identify the causal chain between $en_{o3}$ and $en_{o4}$ avoiding impossible paths. Attack steps such as port scans and cross-host lateral movements can be identified and reasoned on this connection graph.

Figure 17:
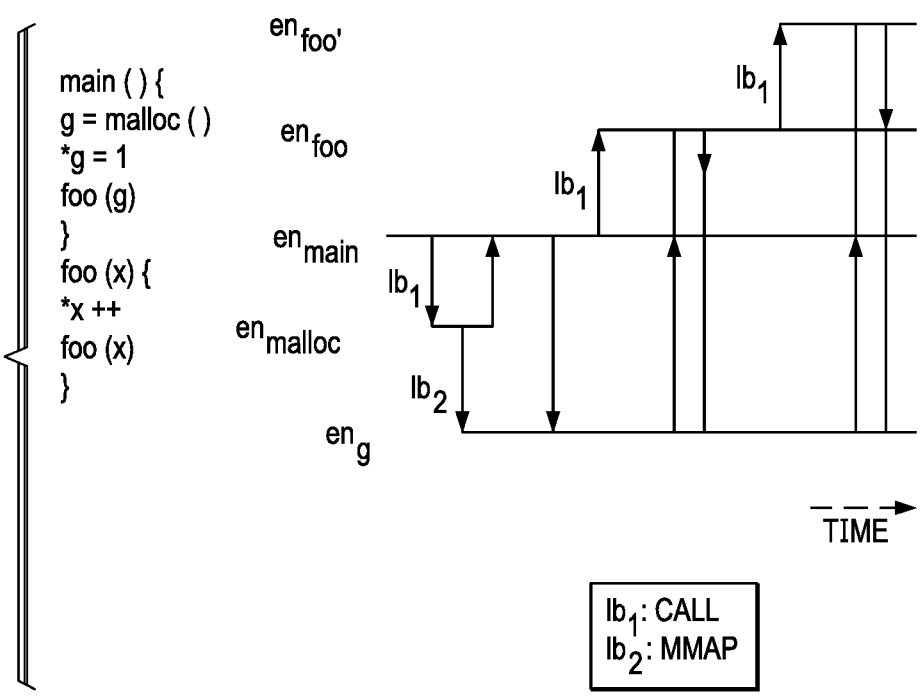
FIG. 17 depicts a representative activity graph for process level activites.

FIG. 17 depicts an AG/CG at the process level, wherein activities with a process are monitored, e.g., via dynamic program analysis. In this graph, entities are memory addresses of code and data; events are instructions (e.g., call) or syscalls (nmap). The infinity of $\Theta$ (the space of entities that can be monitored or traced) supports the representation of recursive calls, e.g., instances of foo ( ) are described as $en_{foo}$, $en'_{foo}$, . . . . Software exploit activities such as return-to-libc and return-oriented programming (ROP) can be captured and inspected on this connection graph.

Given an activity/connection graph that records objective computation histories regarding both intrusive and non-intrusive data, threat recovery reduces to a graph query problem of iteratively computing the closure over the subset of security related subgraphs in the AG/CG, and finally yielding a subgraph that describes the threat or intrusion. Graph queries can be programmed into IDSes or behavior anomaly detection systems, or they can be accomplished through on-demand agile reasoning development. Threat hunting composes sequences of graph queries to iteratively and interactively conceive, verify, revise and confirm threat hypotheses.

The process of composing and executing graph queries in the activity/connection graph is graph computation. During the computation, any variable referencing a subgraph is also a label to the set of entities and events of that subgraph, and the variable can be stored as a label on the AG/CG. Because the outcome of each iterative graph computation step is a subgraph or a label, each step can be implemented natively in a graph computation language or in an external module as a black-box, which outputs a set of events and entities as the subgraph. Threat intelligence therefore is generated in the graph query when a threat is discovered. The query, especially the graph pattern, describes the threat and can be executed to search other activity/connection graphs for the specific threat.

Graph pattern matching is at the core of graph querying. Generalizing, a graph pattern, in essence, is a set of constraints describing the subgraph(s) to be matched, where a constraint over graph elements describes (1) a single graph element (e.g., a label/property of an entity), or (2) an element relation (e.g., an entity connects to an event). Pattern composition allows for embedding human domain knowledge into the deduction procedure. Simple pattern examples, which can be expressed by most graph languages, include: behavior of typical DLL injections (e.g., two entities with PROCESS labels are connected by an event with label CREATE_THREAD), behavior of untrusted executions (e.g., an entity with FILE label but not a TRUSTED_EXE label connects to an event labeled EXECUTE, then to an entity labeled PROCESS), and behavior of data leak (e.g., an entity labeled with SENSITIVE connects to an entity labeled NETFLOW within a given number of hops). These are representative but non-limiting examples.

To manage activity/connection graphs and the program graph computations atop them, preferably the above-described system comprises a graph database designed and implemented to provide efficient data storage and retrieval for live and forensic threat investigations. Preferably, the graph database is backed with a distributed key-value store for low-level PG operation optimization targeting unique connection graph properties, such as data locality and immutability. A representative database of this type is described in "FCCE: Highly scalable distributed Feature Collection and Correlation Engine for low latency big data analytics," to Schales, et al. (hereinafter "FCCE"). Generalizing, a suitable database is one that employs a distributed key-value store for long-term monitoring data storage with data locality optimization, together with concurrent multi-source streaming data ingestion.

The technique described above provides significant advantages. As explained, the approach enables systematic inter-process activity extraction and behavior matching. The technique addresses the deficiencies in prior schemes that rely on signature matching, single (intra-) process detection schemes, and ad-hos inter-process behavior modeling. As noted, the approach herein also enables modeling of both direct and indirect inter-process activities, as well as efficient matching of concrete activities with abstract patterns indicative of malicious or suspicious behaviors. The result is more robust and accurate protection of the endpoint against attack. Further, the technique enables more effective post-detection operations that can be carefully tuned to the detected activity.

Using inter-process behavior patterns as abstract attack signatures as described provides significant benefits as compared to existing concrete attack signature schemes. Inter-process activities monitored in accordance with the techniques herein record attacks with long attack vectors, or attacks that use multiple processes to fulfill attack goals. Prior signature-based approaches do not discover such attacks. Using the abstract/labelled behavior signature (as opposed to a more concrete signature) to express the attack logic, more attack variants can be covered during the detection process. Indeed, prior art techniques, which often operate on fine-grained attack descriptions, thus require significantly more computational power to model and reason, thereby making these techniques impractical or costly. And, attack descriptions that are less fine-grained than the abstract/labelled behavior signature herein, often cannot help to detect intrusions in the endpoint itself. Further, inter-process behavior according to this disclosure has clear semantic meaning for end users to comprehend, and to take actions if needed.

More generally, the above-described approach provides for an improved endpoint detection-based cybersecurity. The subject matter further provides for a new approach to systematically model inter-process behaviors for use in characterizing malicious or suspect behavior patterns between or among processes. This modeling provides the foundation for advanced detection and, in particular, an inter-process malicious/suspicious behavior discovery and inter-process behavior signature matching.

More generally, the approach described provides for enhanced processing with respect to security event data (e.g., a cybersecurity incident), and it enables the system to respond more efficiently to the incident. The approach, being automated, is highly efficient, and it greatly eases the workflow requirements for the SOC analyst to facilitate post-detection operations, such as threat hunting.

Iterative Constraint Solving in Graph Matching for Cyber Incident Reasoning

As noted, the AG/CG is a graph of elements with constraints and connections among them. Pattern matching of such graphs requires satisfying all constraints of all elements, as well as how they are connected. Usually, however, one query from a graph database can only deal with one constraint or connection relation. To address this limitation, the below-described aspect of the disclosure provides a novel constraint solving algorithm to compute and orchestrate queries, as well as to handle the query results, thereby ensuring correctness and efficiency of the abstract graph pattern matching.

With the above as background, the following describes a technique for constraint solving that is utilized for pattern matching, e.g., matching an activity graph (e.g., one built by an endpoint) against a graph pattern. This operation is used, e.g., in an attack subgraph matching function (element 830, step (5) in FIG. 8). As noted above, pattern matching evaluation involves solving the set of constraints, or predicate expressions, defined by the pattern. This task is computationally non-trivial because a pattern can refer to other patterns via parameters, and because the pattern graph typically is stored on distributed external storage, making it expensive to check data associated with each predicate.

To cope with the parametic expressiveness of patterns, preferably the following technique is implemented. In particular, the constraint solving process efficiently decides when and how many times pattern application needs to be performed for a single pattern reference. For example, if a pattern reference associates with a variable that relates to a particular predicate (e.g., reach), the referred pattern may be applied repeatedly in the traversal procedure to minimize on-disk data requests in subsequent traversal steps.

Because on-disk data queries only support solving one constraint at a time, the constraint solving algorithm of this disclosure works by solving constraints iteratively and propagating a latest-solved constraint to all variables associated with previously-satisfied constraints. In particular, when a graph pattern (PG) is parsed and an abstract syntax tree (AST) is created, an interpreter determines how constraints are connected and stores the constraint relations as a graph of constraints (GoC) into a supplementary data structure in the AST. To evaluate a pattern, a constraint solver orders constraints (e.g., by heuristics, user guidance, or the like) and iteratively satisfies all constraints, including single-element constraints (e.g., x has <type: READ>) and multi-element constraints (e.g. x conn y). After each iterative constraint-solving step, variables associated with the pattern may undergo a state change; according to the algorithm herein, this state change is propagated to all previously-stored variables (as used herein, a variable refers to a set of matched results of an element in abstract pattern graph) through a graph traversal on GoC, from the changed variables to all previously-solved variables.

Thus, the graph of constraints (GoC) is derived from PG as a complementary data structure for use by the constraint solving algorithm. Once a constraint in PG is satisfied, the algorithm checks whether all previously satisfied constraints still hold. This operation is designed to remove some subgraph instances in the AG that satisfy previous constraints but not necessarily the latest one. Preferably, this operation is realized as a graph traversal from a latest constraint node in the GoC to all other existing nodes (previously-solved constraints).

Thus, and according to this aspect of the disclosure, an abstract graph pattern matching system serializes simple database queries for single graph element constraint solving and then performs iterative constraint propagation to ensure the correctness of the matching for the entire abstract graph pattern. The basic notion is to evaluate a single element constraint at a time, and then propagate the constraint solving results to all related pattern elements, e.g., by traveling the pattern (as a connected graph, namely the GoC). As will be described, preferably the second half of the one element constraint solving step only evaluates connectivity constraints, but not single element constraints. The steps of single element constraint solving are repeated and single element constraints are evaluated followed by propagations. This process continues until all single element constraints have been evaluated and all propagations have been performed.

Figure 18:
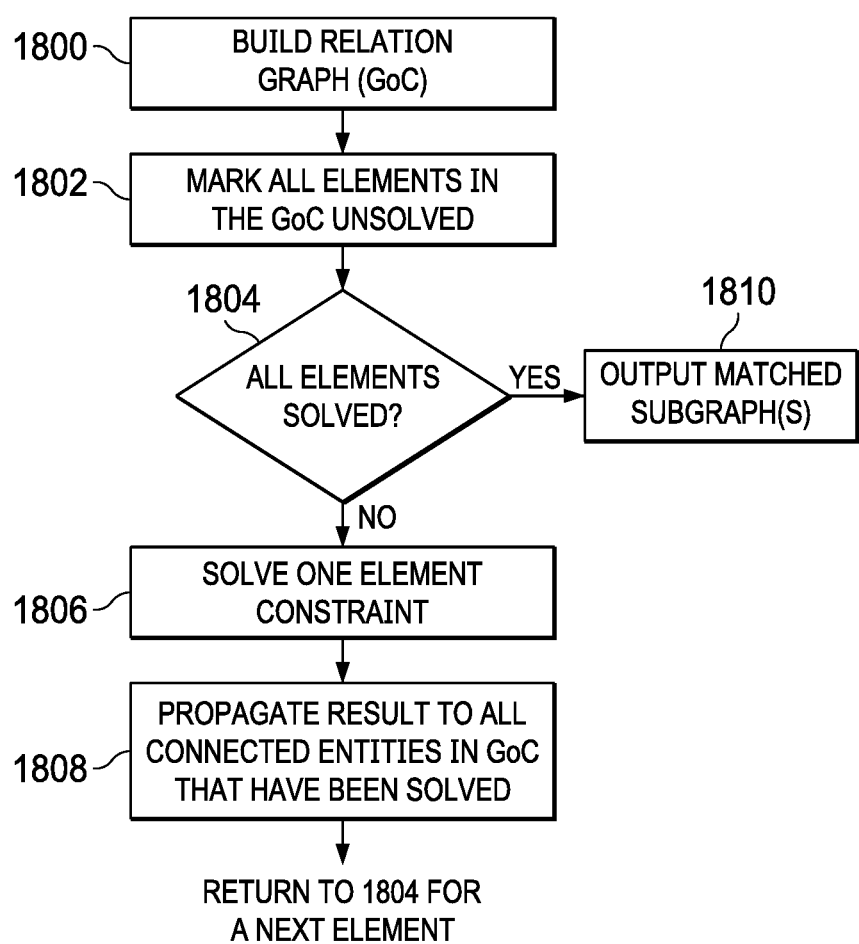
FIG. 18 depicts the iterative constraint solving algorithm as a process flow.

FIG. 18 depicts the iterative constraint solving algorithm as a process flow. The iterative constraint solving algorithm (sometimes referred to as an "iterative constraint solver") provides significant computational- and storage-efficiencies by solving constraints iteratively and propagating a latest-solved constraint to all variables associated with previously-satisfied constraints. Referring to FIG. 18, the process begins at step 1800 by building a relation graph among PG elements, this relation graph being the GoC described above. At step 1802, all elements in the GoC are marked as unsolved. At step 1804, a test is performed to determine whether all elements in the GoC are marked as solved. If not, the routine continues at step 1806 to solve a one element constraint and to then mark it as solved. As noted above, preferably the iterative constraint solver solves one constraint at a time. At step 1808, and with respect to the one element constraint, the results (of solving the one element) are propagated to all connected elements in the GoC that have been solved. The routine then returns to step 1804 and iterates until all elements in the GoC are marked as solved. When the outcome of the test at step 1804 is positive (namely, that all elements in the GoC are marked as solved), the routine continues at step 1810 to output the matched subgraph(s). This completes the processing.

Thus, the iterative solver algorithm of this disclosure starts with an empty set of touched variables and initializes each variable untouched (step 1802). The algorithm then performs new constraint evaluation by evaluating a single constraint per iteration, setting its associated variables as touched (step 1806). In the same iteration, the algorithm then propagates the constraint, in particular by updating related touched variables to reflect the change (step 1808).

The algorithm then repeats the new constraint evaluation (for other constraints not yet marked) and continues until all constraints have been evaluated.

Evaluating a single element constraint is straightforward; in such case, preferably each constraint works like a filter on the graph element. For example:
"element x {type: event_read}" filters out elements in "x" that are not type event_read. Evaluating a connectivity constraint is also straightforward; preferably each constraint works like a filter on two or more graph elements. For example:
"element x connects to y" filters out elements stored in variable "x" that do not connect to "y," and vice versa for "y".

Preferably, the above-described filtering occurs in memory if the variable has been touched in previous iterations. Otherwise, preferably the variable keeps a reference to the entire activity graph (stored in the database). A database query is then generated to filter the entire activity graph.

In one embodiment, the propagation operation (step 1808) uses a custom breath first search (BFS) function that uses a queue that takes into account the connectivity of the GoC. This function takes into consideration whether an element has been solved (as only solved elements are pushed to the queue), and whether the constraint makes any change (a vertex is dropped from the queue if no change occurs). In the preferred approach, the propagation applies element relation constraints based on the newly-solved element to impact the other elements in the relation constraint.

Figure 19:
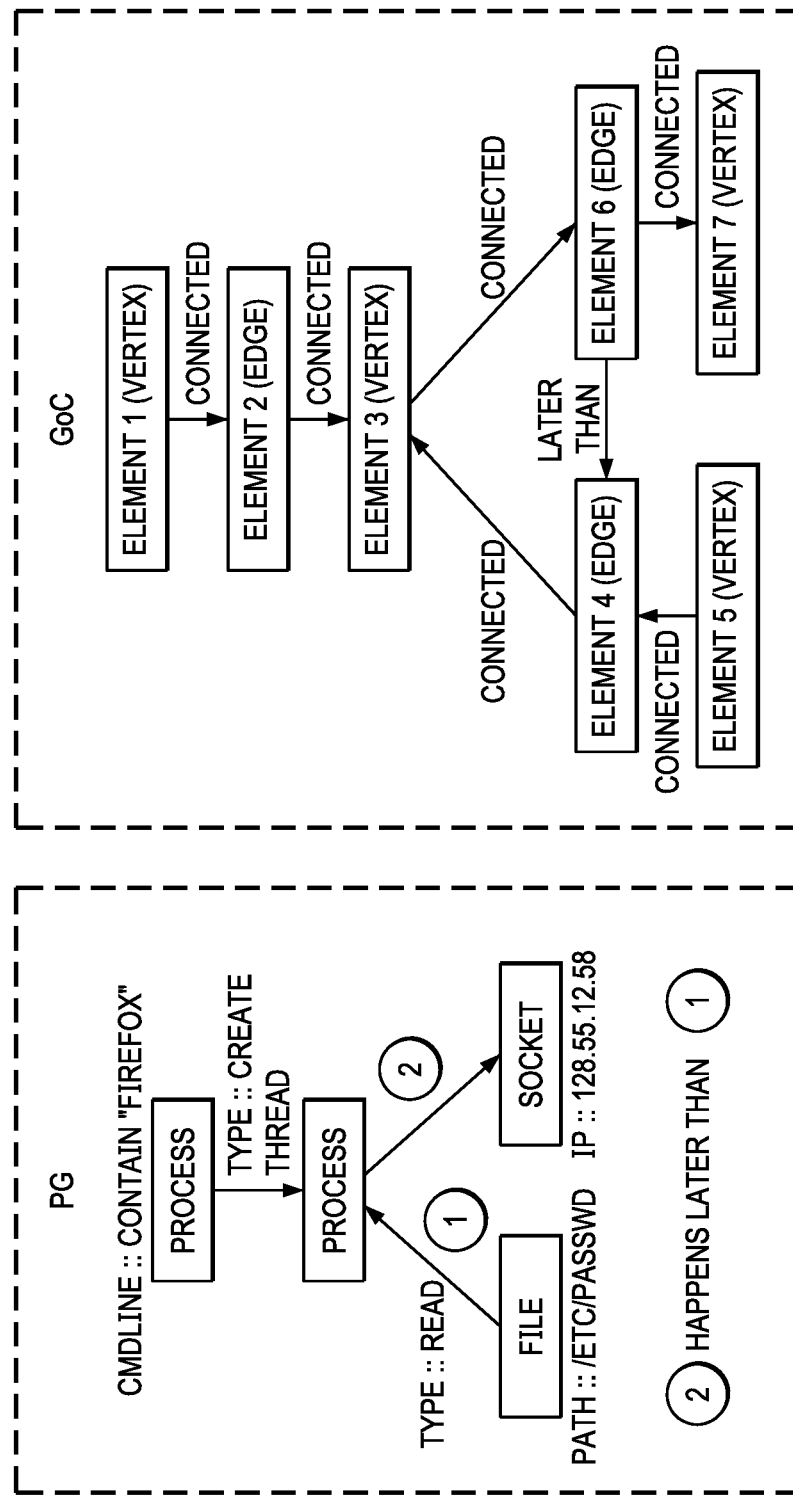
FIG. 19 depicts a representative example of a representative pattern graph, and a corresponding graph of constraints (GoC) derived therefrom.
Figure 20:
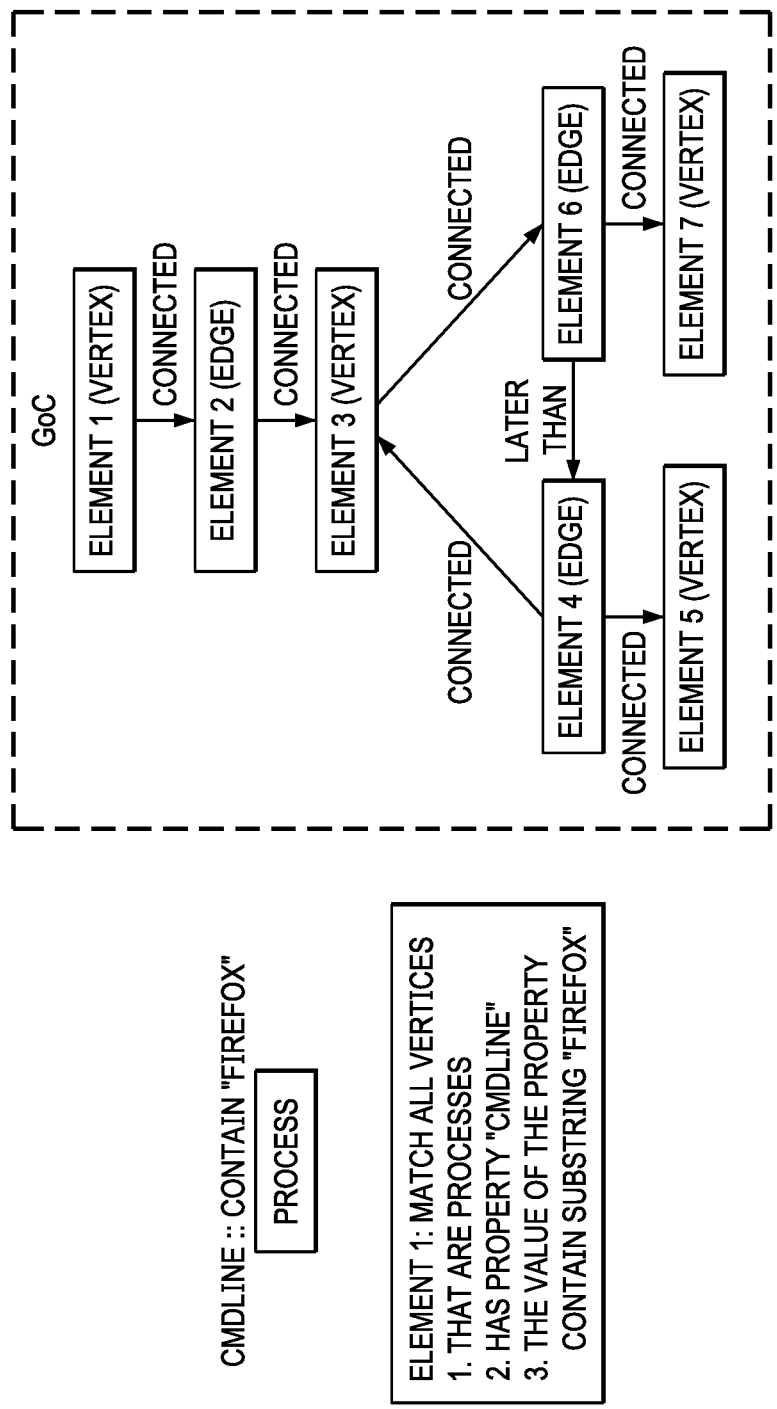
Figure 22:
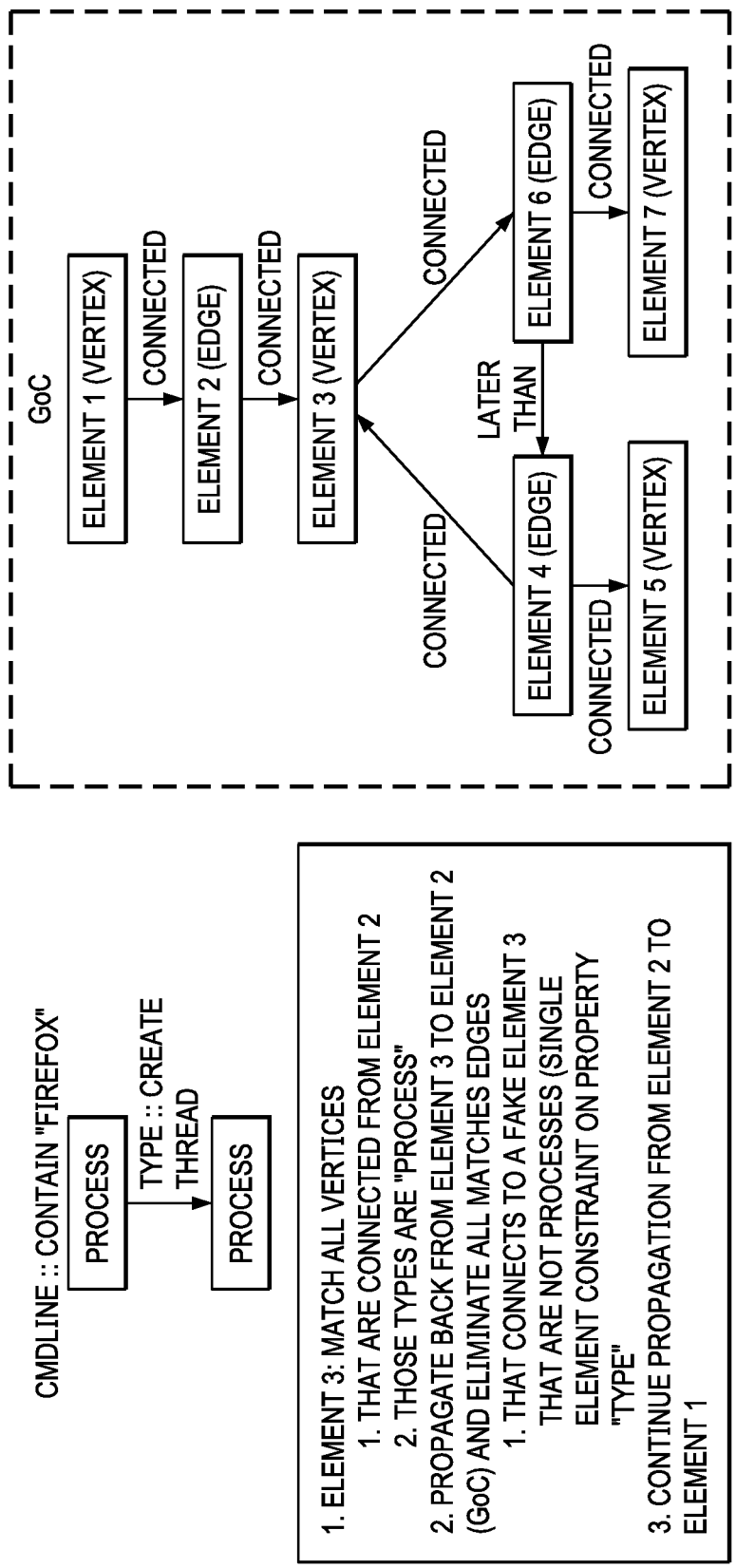

FIG. 19 depicts a representative example of a pattern graph 1900, and a corresponding GoC 1902. FIG. 19 thus corresponds to step 1800 in the process flow in FIG. 18. It should be noted that the GoC may be different from the pattern graph because some element relations may not be written explicitly in the pattern graph. With these examples, FIGS. 20-23 depicts application of the iterative constraint solving algorithm using the GoC and with respect to the pattern graph. In particular, FIG. 20 corresponds to step 1806 in the process flow. Here, the first element is matched (solved), by matching all vertices that are processes, that have the property "cmdline" where the value of the property contains the substring "firefox." FIG. 21, which corresponds to steps 1806 and 1808, depicts how the algorithm then performs propagation, in this case from element 2 to element 1 (in the GoC) and eliminates all matched vertices in element 1 that do not have an element 2 to connect. This is the notion of removing subgraph instances that satisfy previous constraints but not necessarily the latest one. FIG. 22, which also corresponds to steps 1806 and 1808, depicts the further propagation operation, namely, propagating back from element 3 to element 2 (GoC) and eliminating all match edges that connect to a fake element 3 that are not processes (single element constraint on property "type"). FIG. 23, which also corresponds to steps 1806 and 1808, depicts a further propagation operation, namely, propagating back from element 4 to all related elements (in this case, elements 3, 2 and 1) to eliminate vertices and edges due to the single element constraint (type read) of element 4.

Generalizing, according to this approach the GoC is extracted and stored as a supplementary data structure of a pattern. During constraint propagation in an iteration, the GoC is traversed to propagate the impact of filtering from the variable(s) of the evaluated predicate to all other connected touched variables.

There is no requirement that the activity graph on which the iterative constraint solver works is limited to an interprocess activity graph. The interative constraint solving technique described above may be used for any type of activity graph, e.g., an activity graph representing activity data captured in association with a process, a host machine, a network of machines (e.g., wherein each entity is a host), and the like.

In addition, there is no requirement that the iterative constraint solving algorithm be used just for cyber security reasoning, as the technique also may have applicability in other use cases that take advantage of graph pattern matching. Thus, the described approach (namely, serializing simple database queries for single graph element constraint solving and then performing iterative constraint propagation using a supplemental graph of constraints) may be implemented in any abstract graph pattern matching system.

Figure 24:
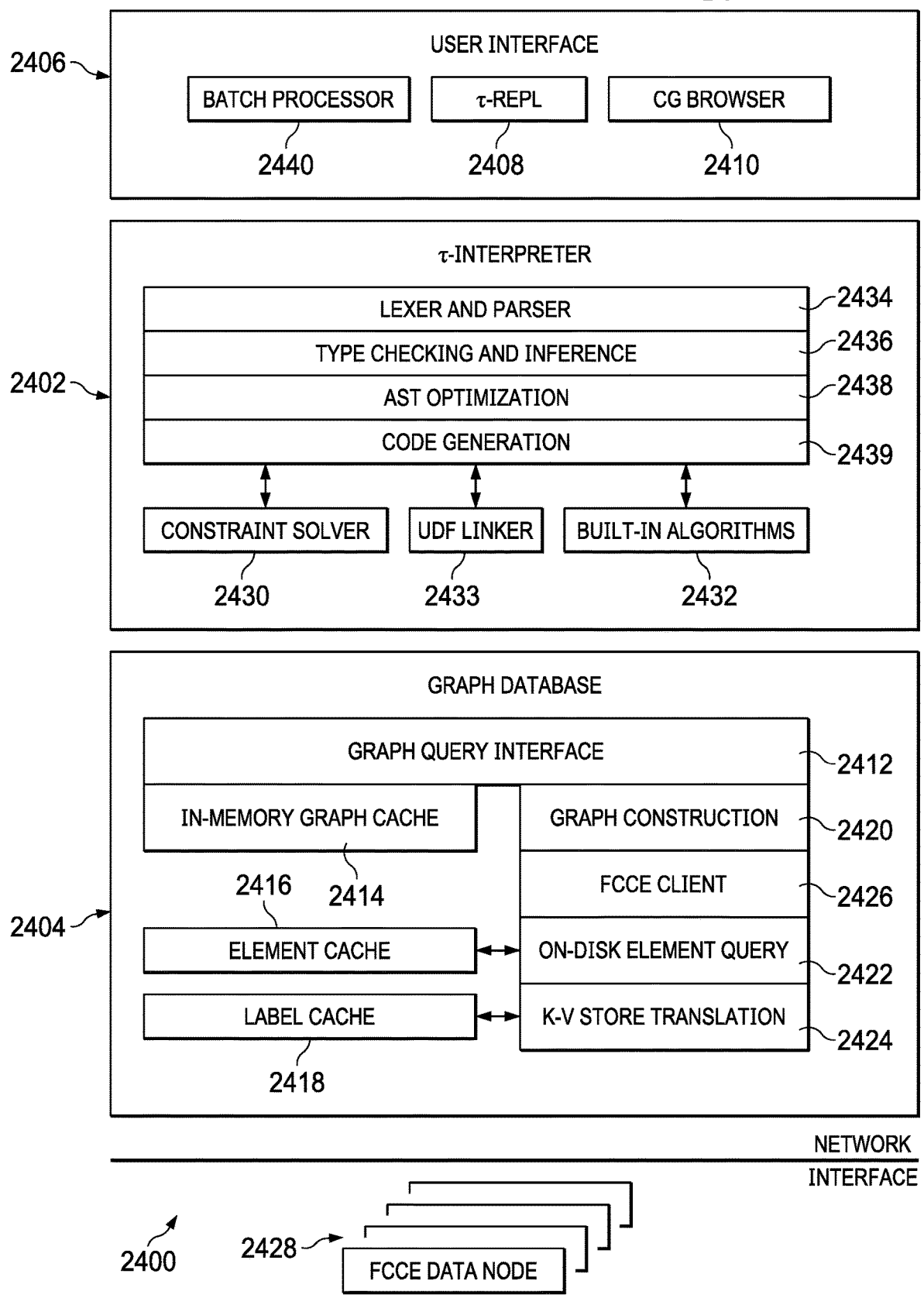
FIG. 24 depicts a representative graph computation platform in which the techniques of this disclosure may be implemented.

FIG. 24 is a block diagram of a representative architecture of a graph computation platform 2400 in which the techniques of this disclosure may be provided. The platform may be implemented in the intelligence center depicted in FIG. 8, in the security intelligence platform in FIG. 3, in the APT solution in FIG. 4, as a standalone functionality or application, as a network- or cloud-accessible service, or otherwise. As depicted, the platform 2400 comprises a language interpreter 2402, a graph database 2404, and user-interface components 2406. The user-interface components 2406 comprise an interactive console 2408, and a connection graph visualization tool (a browser) 2410. The user-interface components provide an interactive programming and data inspection environment for threat reasoning. The graph database 2404 preferably comprises a graph query interface 2412, an in-memory graphy cache 2424, an element cache 2426, a label cache 2428, one or more graph construction routines 2430, an on-disk element query function 2432, a key-value store translation table 2434, and an FCCE client 2436. The FCCE client 2436 interfaces across the network to one or more FCCE data nodes 2438, which nodes store the graphs typically in a distributed manner. As previously noted, the graph database 2404 employs a distributed key-value store over the FCCE data nodes 2438 for long-term monitoring data storage with data locality optimization, and concurrent multi-source streaming data ingestion. The interpreter 2402 comprises a number of functional elements include a code generation module 2439 that works with a constraint solver 2430, other built-in algorithms 2432, and a Universal Disk Format (UDF) linker 2433. Interpreter 2402 also includes a lexer/parser 2434, a type checking and inference module 2436, and an AST optimizer 2438. The user interface also includes a batch processor 2440.

The graph database 2404 stores both in-memory and on-disk pattern graph portions, and it provides graph query APIs (2412) to the interpreter 2402. The main functions of the graph database are to bridge the semantics of the pattern graph and low-level data storage, and to optimize graph retrieval throughput, preferably using multi-layer caches (2414, 2416, 2418) and data arrangement based on PG properties, such as temporal locality of events. As noted above, one such graph database solution that provides these features is FCCE. In particular, FCCE supports concurrent multi-source asynchronous ingestion, distributed data storage, and data locality management. To optimize graph queries based on pattern graph properties, an FCCE schema is used. This schema represents the pattern graph in key-value pairs, and certain values preferably are replicated in one or more schemas for data locality preservation and fast retrieval from different perspectives. Thus, for example, one replica of events may deal with temporal locality, wherein events are indexed by time, and events occurring within a time window are managed on one memory page and stored at consecutive filesystem blocks. Other event replicas may deal with labels and shared entities.

To process a graph query, the graph database first checks whether any portion of the data is already loaded into memory through previous queries. If not, the database preferably splits the graph query into one or more on-disk element queries, each of which is to be translated into key-value queries that the graph database (e.g., FCCE) can process. Labels are expressed as dictionary items to express complex element attributes. In an example operation, a simple element query searching for file entities whose path contains a substring firefox translates into two graph database queries: the first searches for all satisfied labels, and the second searches for raw data to construct elements associated with these labels. When raw data is retrieved from disk, preferably buckets of key-value pairs are first cached in a graph database client where data within a bucket preferably has tight data locality and high probability to be queried in the same high-level graph query or following queries. Then, different components of an element are constructed and some are cached for frequent referencing, e.g., the principal label for proceses containing multiple pieces of information including the username, uid, group, etc., and it is cached as a reference. Next, elements are constructed and cached. Lastly, the requested graph is assembled and returned.

As noted, the approach herein also is designed to be implemented in an automated manner within or in association with a security system, such as a STEM, an APT solution, an endpoint management solution, and others.

The functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures including simple n-tier architectures, web portals, federated systems, and the like. The techniques herein may be practiced in a loosely-coupled server (including a "cloud"-based) environment.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the identity context-based access control functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the graph generation techniques are implemented in a special purpose computer, preferably in software executed by one or more processors. The software is maintained in one or more data stores or memories associated with the one or more processors, and the software may be implemented as one or more computer programs. Collectively, this special-purpose hardware and software comprises the functionality described above.

Further, any authentication or authorization functionality required herein may be implemented as an adjunct or extension to an existing access manager or policy management solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The techniques herein provide for improvements to another technology or technical field, among others: endpoint management systems, APT solutions, security incident and event management (STEM) systems, as well as improvements to knowledge graph-based cyber-analytics, including threat hunting. Cyber threat hunting is the process of proactively and iteratively formulating and validating threat hypotheses based on security-relevant observations and domain knowledge. The approach herein facilitates such activities by modeling threat discovery as a graph computation problem. Indeed, given a process graph that records objective computation histories regarding both intrusive and non-intrusive data, threat discovery reduces to the graph query problem of iteratively computing a closure over a subset of security-related subgraphs in the process graph, and then finally yielding the subgraph that describes the threat of intrusion. Graph queries can be pre-programmed into intrusion detection systems or behavior anomaly detection systems, or the like. Threat hunting composes sequences of graph queries to iteratively and interactively conceive, verify, revise and confirm threat hypotheses.

The graph building and matching techniques herein may be used to discover and act upon inter-process activity in other than an enterprise endpoint machine. The techniques herein may also be used on an intra-process basis.

Having described our invention, what we claim is as follows:

1. A method for storage-efficient graph pattern matching, comprising:
    providing a graph pattern that comprises a set of elements with constraints and connections among them;
    deriving, as a supplemental data structure distinct from the graph pattern, a graph of constraint relations in the graph pattern;
    providing an activity graph representing activity data captured in association with one of: a process, a host machine, and a network of machines; and
    responsive to a query, finding one or more subgraphs of the activity graph that satisfy the graph pattern by iteratively solving constraints in the graph pattern one at a time, wherein after at least one iteration that solves a constraint is completed and before a next constraint is solved, a result is propagated using a graph traversal of the graph of constraint relations.

2. The method as described in claim 1 wherein a constraint is one of:
    a single element defining an attribute of a node or edge in the graph pattern, and an element relation defining how one element relates to another element in the graph pattern.

3. The method as described in claim 1 wherein iteratively solving constraints comprises satisfying a latest-solved constraint in the graph pattern to generate the result, and propagating the result to connected constraints in the graph of constraint relations.

4. The method as described in claim 3 wherein propagating the result to connected constraints evaluates whether a previously-satisfied constraint remains valid and, when the previously-satisfied constraint is no longer valid, removes a subgraph of the activity graph represented by the previously-satisfied constraint.

5. The method as described in claim 4 further including outputting the one or more subgraphs after all single element constraints have been evaluated, and all propagation of results from evaluation of the single element constraints have been performed.

6. The method as described in claim 1 wherein the one or more subgraphs of the activity graph represent a cyber incident.

7. The method as described in claim 6 further including performing a post-detection operation to address the cyber incident.

8. An apparatus for storage-efficient graph pattern matching, comprising:
    a processor;
    computer memory holding computer program instructions executed by the processor, the computer program instructions configured to:
    provide a graph pattern that comprises a set of elements with constraints and connections among them;
    derive, as a supplemental data structure distinct from the graph pattern, a graph of constraint relations in the graph pattern;
    provide an activity graph representing activity data captured in association with one of: a process, a host machine, and a network of machines; and
    responsive to a query, find one or more subgraphs of the activity graph that satisfy the graph pattern by iteratively solving constraints in the graph pattern one at a time, wherein after at least one iteration that solves a constraint is completed and before a next constraint is solved, a result is propagated using a graph traversal of the graph of constraint relations.

9. The apparatus as described in claim 8 wherein a constraint is one of: a single element defining an attribute of a node or edge in the graph pattern, and an element relation defining how one element relates to another element in the graph pattern.

10. The apparatus as described in claim 8 wherein the computer program instructions configured to iteratively solve constraints comprise computer program instructions configured to satisfy a latest-solved constraint in the graph pattern to generate the result, and further configured to propagate the result to connected constraints in the graph of constraint relations.

11. The apparatus as described in claim 10 wherein the computer program instructions configured to propagate the result to connected constraints evaluate whether a previously-satisfied constraint remains valid and, when the previously-satisfied constraint is no longer valid, are further configured to remove a subgraph of the activity graph represented by the previously-satisfied constraint.

12. The apparatus as described in claim 11 wherein the computer program instructions are further configured to output the one or more subgraphs after all single element constraints have been evaluated, and all propagation of results from evaluation of the single element constraints have been performed.

13. The apparatus as described in claim 8 wherein the one or more subgraphs of the activity graph represent a cyber incident.

14. The apparatus as described in claim 13 wherein computer program instructions are further configured to perform a post-detection operation to address the cyber incident.

15. A computer program product in a non-transitory computer readable medium for use in a data processing system for storage-efficient graph pattern matching, the computer program product holding computer program instructions that, when executed by the data processing system, are configured to:
    provide a graph pattern that comprises a set of elements with constraints and connections among them;
    derive, as a supplemental data structure of distinct from the graph pattern, a graph of constraint relations in the graph pattern;
    provide an activity graph representing activity data captured in association with one of: a process, a host machine, and a network of machines; and
    responsive to a query, find one or more subgraphs of the activity graph that satisfy the graph pattern by iteratively solving constraints in the graph pattern one at a time, wherein after at least one iteration that solves a constraint is completed and before a next constraint is solved, a result is propagated using a graph traversal of the graph of constraint relations.

16. The computer program product as described in claim 15 wherein a constraint is one of: a single element defining an attribute of a node or edge in the graph pattern, and an element relation defining how one element relates to another element in the graph pattern.

17. The computer program product as described in claim 15 wherein the computer program instructions configured to iteratively solve constraints comprise computer program instructions configured to satisfy a latest-solved constraint in the graph pattern to generate the result, and further configured to propagate the result to connected constraints in the graph of constraint relations.

18. The computer program product as described in claim 17 wherein the computer program instructions configured to propagate the result to connected constraints evaluate whether a previously-satisfied constraint remains valid and, when the previously-satisfied constraint is no longer valid, are further configured to remove a subgraph of the activity graph represented by the previously-satisfied constraint.

19. The computer program product as described in claim 18 wherein the computer program instructions are further configured to output the one or more subgraphs after all single element constraints have been evaluated, and all propagation of results from evaluation of the single element constraints have been performed.

20. The computer program product as described in claim 15 wherein the one or more subgraphs of the activity graph represent a cyber incident.

21. The computer program product as described in claim 20 wherein computer program instructions are further configured to perform a post-detection operation to address the cyber incident.

* * * * *